US010883873B1

(12) United States Patent
Awadh et al.

(10) Patent No.: US 10,883,873 B1
(45) Date of Patent: Jan. 5, 2021

(54) ROTATING SAMPLE PLATFORM FOR SERS ANALYSIS

(71) Applicant: KING FAHD UNIVERSITY OF PETROLEUM AND MINERALS, Dhahran (SA)

(72) Inventors: Tawfik Abdo Saleh Awadh, Dhahran (SA); Abdulaziz Al-Saadi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/655,326

(22) Filed: Oct. 17, 2019

(51) Int. Cl.
*G01J 3/02* (2006.01)
*G01J 3/44* (2006.01)

(52) U.S. Cl.
CPC ............ *G01J 3/0202* (2013.01); *G01J 3/027* (2013.01); *G01J 3/44* (2013.01)

(58) Field of Classification Search
CPC .................................................. G01J 3/0202
USPC ......................................................... 356/301
See application file for complete search history.

(56) References Cited

U.S. PATENT DOCUMENTS

| 5,994,150 | A  | 11/1999 | Challener et al. |
| 9,013,704 | B2 | 4/2015  | Garcia Da Fonseca et al. |
| 9,772,290 | B2 | 9/2017  | Hossain et al. |
| 2003/0054542 | A1 | 3/2003 | Burns et al. |
| 2005/0158877 | A1 | 7/2005 | Wang et al. |
| 2010/0285989 | A1* | 11/2010 | Huo ................. G01N 33/54346 506/9 |

(Continued)

FOREIGN PATENT DOCUMENTS

| CN | 104076023 A | 10/2014 |
| JP | 2009053168 A | 3/2009 |

(Continued)

OTHER PUBLICATIONS

Asiala et al., "Surface-Enhanced, Spatially Offset Raman Spectroscopy (SESORS) in Tissue Analogues", ACS Applied Materials & Interfaces, Jun. 29, 2017 (7 pages).

(Continued)

*Primary Examiner* — Tarifur R Chowdhury
*Assistant Examiner* — Omar H Nixon
(74) *Attorney, Agent, or Firm* — Oblon, McClelland, Maier & Neustadt, L.L.P.

(57) ABSTRACT

A rotating sample platform for SERS detection having sample holders for presenting a plurality of samples to a SERS laser at a speed and dwell time related to the Raman spectra. The sample holder may be designed to hold either slides or cuvettes, each of which contains either gold or silver nanoparticles. The sample holder for slides is configured for tilting each slide. The degree of tilt is captured by a wireless read head. A controller is configured to receive the wireless read head signals and the Raman spectra for each sample, correct the speed and dwell time and actuate a motor to rotate the sample platform at the corrected speed and dwell time. The rotating sample platform allows a set of slides or cuvettes in a sample holder to be presented to the SERS detector in a continuous manner, minimizing background corrections and sample adjustment time.

14 Claims, 22 Drawing Sheets

(56) References Cited

U.S. PATENT DOCUMENTS

| | | | |
|---|---|---|---|
| 2011/0021970 A1* | 1/2011 | Vo-Dinh | A61K 41/0042 604/20 |
| 2011/0157592 A1 | 6/2011 | Tsao et al. | |
| 2012/0225493 A1* | 9/2012 | Piorek | G01N 1/2273 436/501 |
| 2012/0236304 A1* | 9/2012 | Lee | G01N 21/658 356/301 |
| 2012/0242987 A1* | 9/2012 | Liu | G01J 3/44 356/301 |
| 2014/0118733 A1 | 5/2014 | Harward | |
| 2016/0166186 A1* | 6/2016 | Ferguson | A61B 5/14546 600/352 |
| 2018/0275088 A1* | 9/2018 | Huff | C12Q 1/6869 |

FOREIGN PATENT DOCUMENTS

| | | |
|---|---|---|
| WO | 2009/089007 A2 | 7/2009 |
| WO | 2009/089007 A3 | 7/2009 |

OTHER PUBLICATIONS

Fan et al., "Silver nanoparticles self assembly as SERS substrates with near single molecule detection limit", Physical Chemistry Chemical Physics Journal, Jul. 15, 2009 (9 pages).

Ngo et al., "Gold Nanoparticles Paper as Surface Enhanced Raman Scattering (SERS) Platform for Bio-Diagnostic Applications", Trans. of the XVth Fund. Res. Symp. Cambridge, 2013, pp. 967-989 (24 pages).

"SERS Substrates", Ocean Optics Inc., Retrieved May 29, 2019 (3 pages).

\* cited by examiner

Note: This slide to be corrected based on inventor comments.

ROTATING SAMPLE PLATFORM FOR SERS ANALYSIS

BACKGROUND

Technical Field

The present disclosure is directed to a rotating sample platform, designs for sample holders and methods of using a rotating sample platform in SERS detection of analytes.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Raman spectroscopy is a fast, non-invasive, non-destructive analytical tool. The development of commercial Raman spectrometers has been spurred by technological improvements in laser, optical filter and charge-coupled device (CCD) detectors. Modern Raman microspectrometers achieve high sensitivity from liquids and solids with volumes of only a few femtoliters. Raman spectroscopy is typically used to determine vibrational modes of molecules, although rotational and other low-frequency modes of systems may also be observed. Raman spectroscopy relies upon inelastic scattering of photons, known as Raman scattering. A source of monochromatic light, usually from a laser in the visible, near infrared, or near ultraviolet range, is used. The laser light interacts with molecular vibrations, phonons or other excitations in the system, resulting in the energy of the laser photons being shifted up or down. This shift in energy gives information about the vibrational modes in the system.

In chemical analysis, Raman spectroscopy is used to identify molecules and study chemical bonding and intramolecular bonds. Because vibrational frequencies are specific to a molecule's chemical bonds and symmetry, Raman provides a fingerprint to identify molecules. Thus, Raman spectroscopy is suitable for the microscopic examination of minerals, materials such as polymers and ceramics, cells, proteins and forensic trace evidence.

A Raman microscope begins with a standard optical microscope, and adds an excitation laser, a monochromator or polychromator, and a sensitive detector (such as a charge-coupled device (CCD), or photomultiplier tube (PMT)). Typically a sample is illuminated with a laser beam. Electromagnetic radiation from the illuminated spot is collected with a lens and sent through the monochromator. Elastic scattered radiation at the wavelength corresponding to the laser line (Rayleigh scattering) is filtered out by either a notch filter, edge pass filter, or a band pass filter, while the rest of the collected light is dispersed onto a detector.

For every 10 million photons that are incident on a sample, only one of those will be Raman scattered. The Raman Effect is very weak, which leads to low sensitivity, making it difficult to measure low concentrations of a substance. Further, sample heating through the intense laser radiation can destroy the sample or mask the Raman spectrum.

Scanning angle (SA) Raman spectroscopy is a technique that involves measuring light reflectivity at a variety of incident angles while simultaneously collecting Raman scattering at each angle. SA-Raman spectroscopy provides the flexibility of employing a variety of interface configurations when collecting Raman scatter over multiple incident angles to determine depth information.

Surface enhanced Raman spectroscopy (SERS) is a powerful vibrational spectroscopy technique that allows for highly sensitive structural detection of low concentration analytes through the amplification of electromagnetic fields generated by the excitation of localized surface plasmons. The term surface enhanced Raman spectroscopy implies that it provides the same information that traditional Raman spectroscopy does, simply with a greatly enhanced signal. At the most basic level, SERS is a way to significantly increase the signal from the weak yet structurally rich technique of Raman scattering. At its most complex level, single molecules are now routinely observed due to the large enhancement. The enhancement factor can be as much as $10^{10}$ to $10^{11}$, which means the technique may detect single molecules. Additionally, SERS may characterize small numbers of molecules bound to or near plasmonic surfaces. Following excitation of the plasmon resonance and generation of the SERS signal, the detection process is identical to normal Raman experiments. The success of SERS is highly dependent on the interaction between adsorbed molecules and the surface of plasmonic nanostructures, often the classic SERS substrates of gold (Au), silver (Ag), or copper (Cu). In general, Au and Ag are most often used as SERS substrates because they are air stable materials, while Cu is more reactive. All three metals have localized surface plasmon resonanaces that cover most of the visible and near infrared wavelength range, where most Raman measurements occur. The power of SERS lies in its ability to identify chemical species and obtain structural information in a wide variety of fields including polymer and materials science, biochemistry and biosensing, catalysis, and electrochemistry. SERS biosensors are used in detection of various biological samples and diseases, including various cancers, glucose measuring in diabetes, detection of highly toxic molecules, such as chemical warfare agents and toxic industrial chemicals. (See Bhavya Sharma, Renee R. Frontiera, Anne-Isabelle Henry, Emilie Ringe, and Richard P. Van Duyne, "SERS: Materials, applications, and the future", Materials Today, Jan.-Feb. 2012, Vol. 15, No. 1-2, pages 16-25; Xu, X., Li, H., Hasan, D., Ruoff, R. S., Wang, A. X. and Fan, D. L. (2013), Near-Field Enhanced Plasmonic-Magnetic Bifunctional Nanotubes for Single Cell Bioanalysis. Adv. Funct. Mater. doi:10.1002/adfm.201203822; Blackie, Evan J.; Le Ru, Eric C.; Etchegoin, Pablo G. (2009). "Single-Molecule Surface-Enhanced Raman Spectroscopy of Nonresonant Molecules". J. Am. Chem. Soc. 131 (40): 14466-14472. doi:10.1021/ja905319w. PMID 19807188; Blackie, Evan J.; Le Ru, Eric C.; Meyer, Matthias; Etchegoin, Pablo G. (2007). "Surface Enhanced Raman Scattering Enhancement Factors: A Comprehensive Study". J. Phys. Chem. C. 111 (37): 13794-13803. CiteSeerX 10.1.1.556.4418. doi:10.1021/jp0687908; Nie, S; Emory, S R (1997). "Probing Single Molecules and Single Nanoparticles by Surface-Enhanced Raman Scattering". Science. 275 (5303): 1102-6. doi:10.1126/science.275.5303.1102. PMID 9027306; Le Ru, Eric C.; Meyer, Matthias; Etchegoin, Pablo G. (2006). "Surface enhanced raman scattering". J. Phys. Chem. B. 110 (4): 1944-1948. doi:10.1021/jp054732; Moskovits, M.; Suh, J. S. (1984). "Surface selection rules for surface-enhanced Raman spectroscopy: calculations and application to the surface-enhanced Raman spectrum of phthalazine on silver". The Journal of Physical Chemistry. 88 (23): 5526-5530, each incorporated herein by reference in its entirety).

While SERS can be performed in colloidal solutions, today the most common method for performing SERS measurements is by depositing a liquid sample onto a silicon or glass surface with a nanostructured noble metal surface. While the first experiments were performed on electrochemically roughened silver, now surfaces are often prepared using a distribution of metal nanoparticles on the surface. (See Mock, J. J.; Barbic, M.; Smith, D. R.; Schultz, D. A.; Schultz, S. (2002). "Shape effects in plasmon resonance of individual colloidal silver nanoparticles". The Journal of Chemical Physics. 116 (15): 6755; Witlicki, Edward H.; et al. (2011). "Molecular Logic Gates Using Surface-Enhanced Raman-Scattered Light". J. Am. Chem. Soc. 133 (19): 7288-7291; Lin, Haohao; Mock, Jack; Smith, David; Gao, Ting; Sailor, Michael J. (August 2004). "Surface-Enhanced Raman Scattering from Silver-Plated Porous Silicon". The Journal of Physical Chemistry B. 108 (31): 11654-11659; Talian, Ivan; Mogensen, Klaus Bo; Oriňák, Andrej; Kaniansky, Dušan; Hübner, Jörg (August 2009). "Surface-enhanced Raman spectroscopy on novel black silicon-based nanostructured surfaces". Journal of Raman Spectroscopy. 40 (8): 982-986; Katherine N. Kanipe, Philip P. F. Chidester, Galen D. Stucky, and Martin Moskovits "Large Format Surface-Enhanced Raman Spectroscopy Substrate Optimized for Enhancement and Uniformity", ACS Nano 2016 10 (8), 7566-7571 DOI: 10.1021/acsnano.6b02564; Shrestha, L K; Wi J S; Williams J; Akada M; Ariga K (March 2014). "Facile fabrication of silver nanoclusters as promising surface-enhanced Raman scattering substrates". Journal of Nanoscience and Nanotechnology. 14 (3): 2245-51, each incorporated herein by reference in its entirety).

The increased resonance within a sample undergoing SERS testing can be problematic as strong fluorescence may overheat the sample, causing sample deterioration. Additionally, the strongest signals are obtained at a preferred angle of incidence. However, for an unknown analyte or analyte thickness, the preferred angle of incidence of the laser is not known. Moving the angle of incidence of the laser while keeping the substrate at a constant position may overheat the substrate.

Accordingly, it is one object of the present disclosure to provide a rotating sample platform and method for SERS detection of analytes which overcomes the overheating problem and the need to change the laser angle to obtain the preferred angle of incidence.

SUMMARY

In an exemplary embodiment, a rotating sample platform for SERS detection comprises a rotator having an upright shaft, wherein the upright shaft is connected to the rotator and located along a vertical axis of the rotator, a motor having a motor shaft, wherein the motor shaft is connected to a base of the upright shaft, a sample platform concentrically located on the upright shaft, wherein the upright shaft is configured to protrude through the sample platform, a sample holder configured to hold a plurality of samples containing either gold or silver nanoparticles, wherein the sample holder includes a sleeve configured to fit over the upright shaft and attach to the sample platform, a SERS detector having a laser configured to direct a light beam to each slide and to analyze scattered light from each slide, a controller electrically connected to the motor, wherein the controller is configured to actuate the motor shaft to rotate the sample platform. The sample holder may be configured to hold slides at different angles of incidence to the laser beam. Alternatively, the sample holder may be configured to hold cuvettes. Controller circuitry may be configured to operate the motor in a speed and dwell time pattern, which may be adjusted based on the detection results and the angle of incidence which gives the greatest Raman spectral amplitude. The rotating sample platform presents each slide consecutively to the laser beam, which minimizes background corrections.

In another exemplary embodiment, a method for combining a rotating sample platform 300 with SERS detection is described, comprising coating a plurality of surfaces with a plurality of gold or a plurality of silver nanoparticles to form a plurality of coated surfaces, placing an analyte on each coated surface to form a plurality of analyte coated surfaces, placing each analyte coated surface into a sample holder attached to the rotating sample platform, consecutively radiating a laser beam, with a SERS detector, onto each analyte coated surface, detecting, with the SERS detector, Raman spectra of each analyte coated surface, generating, with a controller including processing circuitry configured for analyzing the Raman spectra, a calibration curve for each analyte coated surface. The calibration curve can be used for identifying an unknown analyte, determining a preferred angle of incidence of a particular analyte, correcting a motor speed and dwell time pattern.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
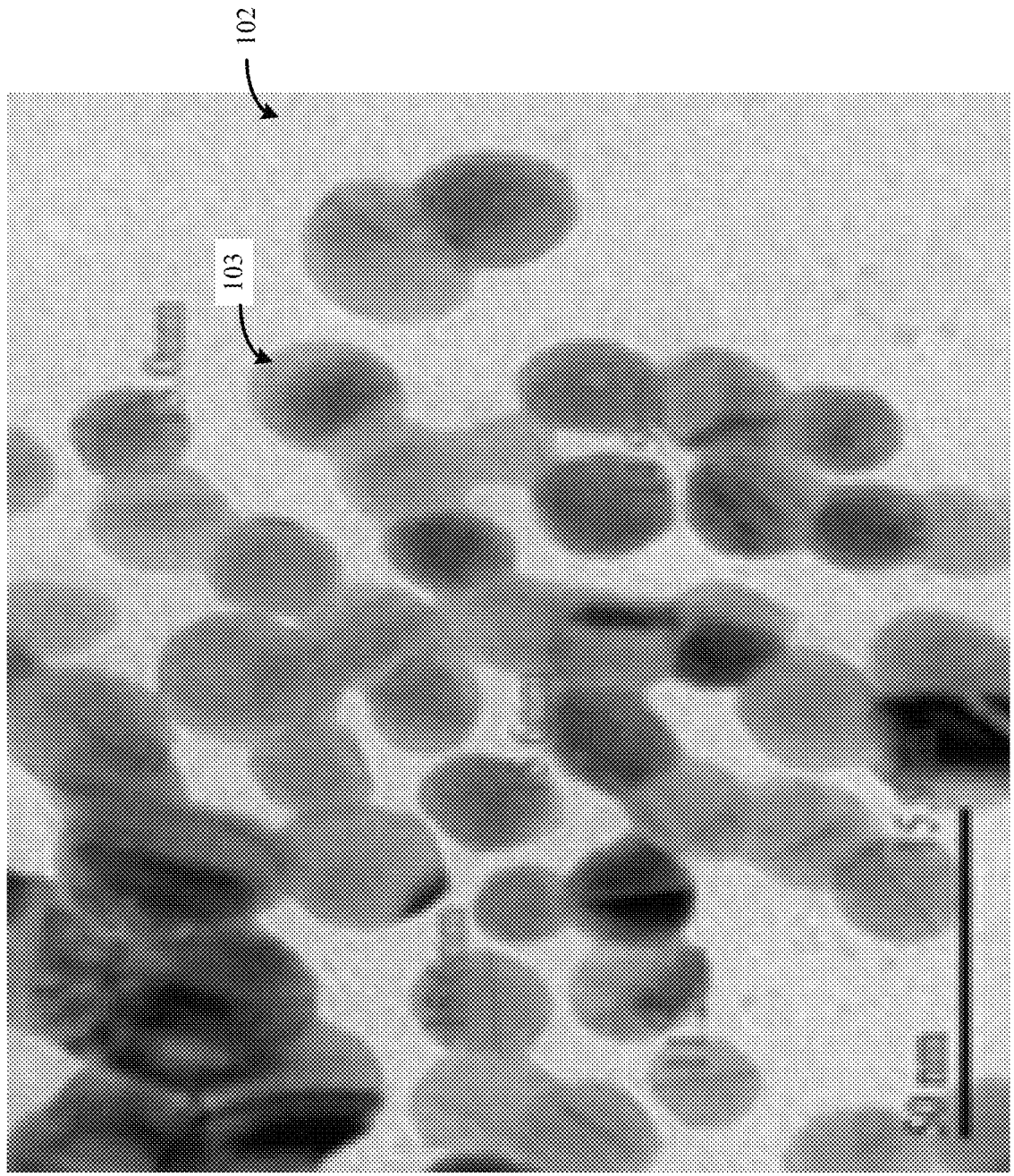
FIG. 1A illustrates nanoparticles.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

In general, spectroscopic techniques and chromatography are important tools usually employed in the detection of a very low concentration of targets. However, the band enhancement brought about by SERS has given the spectroscopic technique an edge, as a target may be detected at a $10^{-10}$ molar level.

A Raman spectrum is a plot of the intensity of Raman scattered radiation as a function of its frequency difference from the incident radiation (usually in units of wavenumbers, $cm^{-1}$). This difference is called the Raman shift. Because it is a difference value, the Raman shift is independent of the frequency of the incident radiation. This relationship holds true for the SERS detection of the present disclosure, as SERS is substrate enhancement of an otherwise Raman spectrum.

"Accumulations" is the number of repetitions of a spectral scan. The accumulations are automatically co-added, to produce spectra with better signal-to-noise ratios. Using several accumulations of a short scan can be preferable to performing one long scan. If the sample has a high fluorescence background, a long scan will saturate the detector, whereas several short scans will not. This allows an improvement in the single-to-noise ratio. Additionally, a long scan may overheat the sample, causing deterioration of the scanned sites.

The "$R^2$" linear determination coefficient is a statistical measure that represents the proportion of the variance for a dependent variable that is predictable from the independent variable(s). It is a statistic used in the context of statistical models whose main purpose is either the prediction of future outcomes or the testing of hypotheses, on the basis of other related information. It provides a measure of how well observed outcomes are replicated by the model, based on the proportion of total variation of outcomes explained by the model. In the present disclosure, the $R^2$ coefficient is used as a measure of the exactness of the calibration.

"Limit of detection" (LoD) and "limit of quantification" (LoQ) are two important performance characteristics in method validation. "Limit of Blank" (LoB) is the highest apparent analyte concentration expected to be found when replicates of a blank sample containing no analyte are tested. LoD and LoQ are terms used to describe the smallest concentration of an analyte that can be reliably measured by an analytical procedure. LoD is determined by utilizing both the measured LoB and test replicates of a sample known to contain a low concentration of analyte. LoQ is the lowest concentration at which the analyte can not only be reliably detected but at which predefined goals for bias and imprecision are met.

Aspects of this disclosure are directed to a rotating sample platform for SERS detection and a method for combining a rotating sample platform with SERS detection.

In one aspect of the present disclosure, a rotating sample platform is described which includes a sample holder configured to hold a plurality of slides at various orientations. The rotating sample platform is further configured to rotate each slide beneath a SERS laser for a desired sampling time. A controller is configured to adjust the sampling time, rotational speed and direction of rotation of the platform. Samples that otherwise would be destroyed or damaged by the strong laser light may be placed in the sample holder, where rotation of the platform provides a continuously fresh sample under the laser beam, thus limiting the heating time.

Holding the slides at different orientations to the laser allows the detection of a collection of standard (reference) solutions and then analyte samples in a short time period and in sequence. Thus, there is no significant time between the measurements and there is no need to stop the laser after each measurement. Therefore, the background corrections are equal and the error is minimized. This improves the SERS detection of analyte solutions in a series of slides coated with nanoparticles. For example, a first slide may be coated with only nanoparticles and no analyte, the second to sixth slides may be reference samples of different analytes, and the seventh and eighth slides may be coated with unknown analytes. A SERS detector may compare the resonances of the different slides to one another to match the unknown to a reference sample.

Additionally, aspects are directed to providing a calibration sequence to be used in providing a baseline for detection of an analyte. An analyte may be placed on each one of a series of slides covered with gold, silver or copper nanoparticles. In a preferred aspect, at least one slide may not receive the analyte in order to establish a comparison reference. Each slide is placed in the sample holder so that it is held at a different angle of incidence to the SERS laser. The platform is set to rotate at a selected speed, which may vary depending on the number of slides and the type of analyte. The rotation may be stopped during the SERS measurement and then continue to move the next slide into position. The SERS measurement entails varying the laser wavelength over a range of preferably 400-2000 $cm^{-1}$ to determine the resonance peaks of the scattered radiation for each slide. The calibration sequence may be stored as a reference set in a database for identification of unknown analytes. The calibration sequence may also be used to determine the angle of incidence which provides the greatest amplitude for each specific analyte type. The calibration sequence may further be used to determine depth information of the sample. Additionally, the calibration sequence may establish an optimum dwell time of the sample under the laser, in order to balance response acquisition time against overheating of the sample. Calibration sequences for each analyte may be established and stored in a database or other comparison record, such as a table. Dwell times, laser power and preferred angles of incidence for each analyte may be stored with each calibration sequence.

The highest output of the SERS measurement results determines the preferred angle of incidence. The substrate sets may then be interrogated at the preferred angle of incidence to collect and identify the analyte. Further, an enhanced substrate set can be evaluated to determine the Raman shift before applying an analyte and then after adding the analyte to determine the difference, where the difference may be compared to a database which links the difference to a particular molecule.

In a further aspect of the present disclosure, the rotating sample platform may be carried by an X-Y stage to allow raster scanning of the sample.

In an additional aspect, a plurality of types of sample holders may be used. Each sample holder may be configured to hold a slide at a preferred angle of incidence related to a type of analyte to be determined. In a few non-limiting examples, one analyte may be a water sample suspected of contamination by naphthalene, one analyte may be a scraping of plastic suspected of containing phenanthrene (used in explosives), one analyte may be a blood sample suspected of having containing thiouracil, one analyte may be a plant for which the quantity of valeric acid is to be determined and one analyte may be a blood sample suspected of containing procaine. The number of analyte samples which can be presented to the laser is limited only by the dimensions of the laser stand. Preferably, each sample holder may provide mountings for three to twenty slides, although the number of samples may be larger if the samples are smaller. The sample holder may hold three to one hundred slides, preferably three to fifty slides, more preferably three to twenty slides, even more preferably three to ten slides.

In another aspect, each slide may be configured to hold a plurality of analytes. In this aspect, raster scanning of the sample must be used to detect each analyte and the SERS detection analysis must be configured to separate the signals for each raster line or block. This aspect presents the added benefit of quickly analyzing a large amount of analyte samples, especially when many of the samples may not contain the target analyte. In a non-limiting example of testing water samples from a plurality of locations for naphthalene contamination, many of the samples may contain only water. In this example, at least one slide or one location on a slide should contain only pure water as a reference.

In another additional aspect, the angle of incidence of each slide may be adjustable so as to present each slide to the laser at the preferred angle of incidence of the suspected analyte.

In a further additional aspect, the sample holder may be configured to hold cuvettes rather than slides. A cuvette may be needed to hold the analyte for large samples or when time does not allow a slide to be prepared. Each cuvette is prepared to hold a colloid of either gold or silver nanoparticles before the analyte is added. The number of cuvettes which can be presented to the laser is limited only by the dimensions of the laser stand. Preferably, each sample holder may hold three to ten cuvettes. Each cuvette may be 1 cm radius and 2 cm in height. The sample holder may further be configured with wells to hold each cuvette securely, which decreases noise due to colloid vibration from rotation of the platform.

The slides may be coated with nanoparticles selected from the group of silver nanoparticles, gold nanoparticles, silver nanoparticles loaded on graphene and gold nanoparticles loaded on graphene. The slides coated with nanoparticles are used as substrates for SERS measurements.

FIG. 1A illustrates a colloid 102 containing nanoparticles 103. The sizes of the nanoparticles range from 11.2 to 15.9 nm.

Figure 1C:
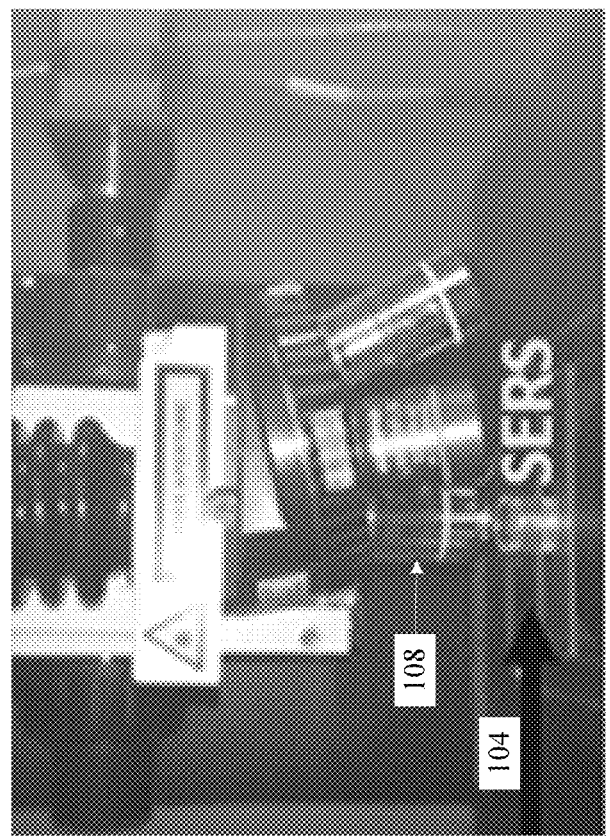
FIG. 1C illustrates the placement of a cuvette beneath a SERS laser.
Figure 1B:
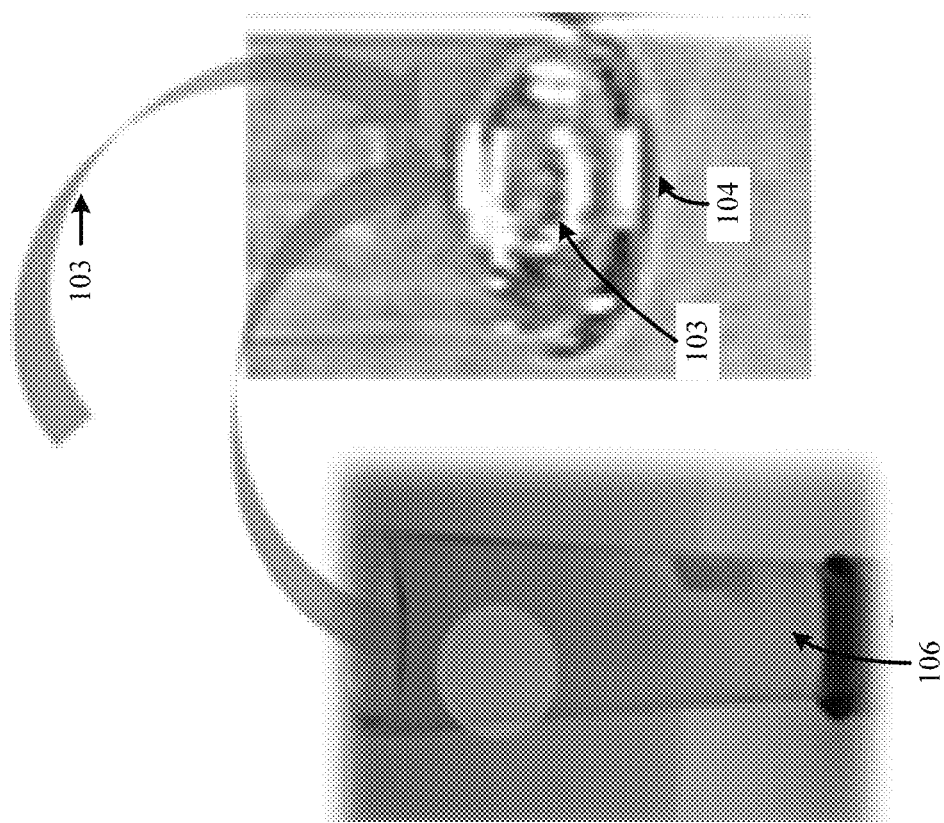
FIG. 1B illustrates a cuvette containing a colloid of nanoparticles and analyte.

FIG. 1B illustrates an analyte 106 being added to a cuvette 104 containing the nanoparticle colloid 102. FIG. 1C illustrates a SERS objective 108 imaging a single cuvette 104 which contains the combined analyte and silver nanoparticle colloid.

Figures 2A, 2B:
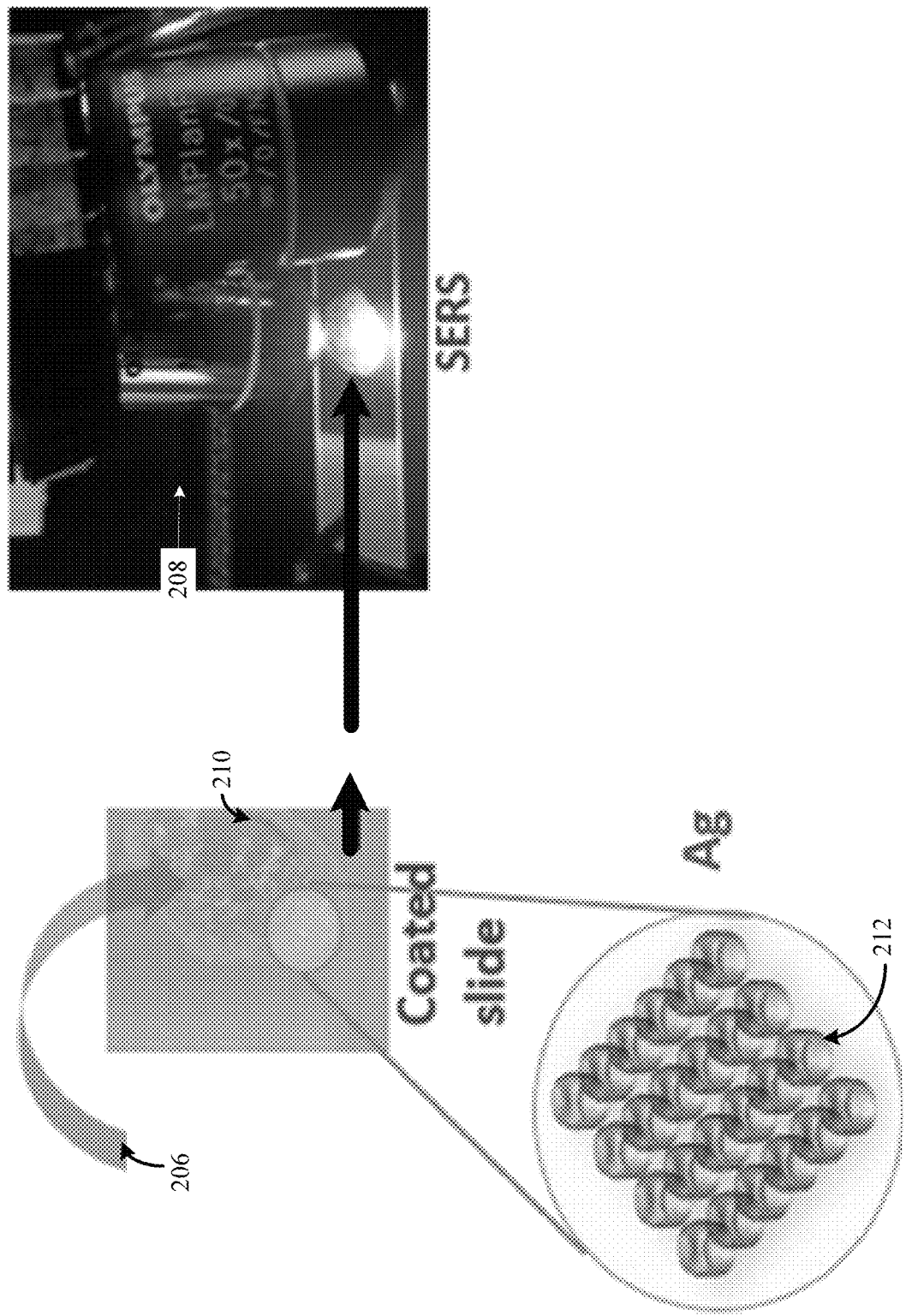
FIG. 2A illustrates a slide coated with nanoparticles and the addition of an analyte.
FIG. 2B illustrates the placement of a slide beneath a SERS laser.

FIG. 2A illustrates placing an analyte 206 upon a slide 210 which is coated with nanoparticles 212. FIG. 2B illustrates a SERS objective 208 imaging a single nanoparticle coated slide 210 which contains the analyte 206.

Figure 3A:
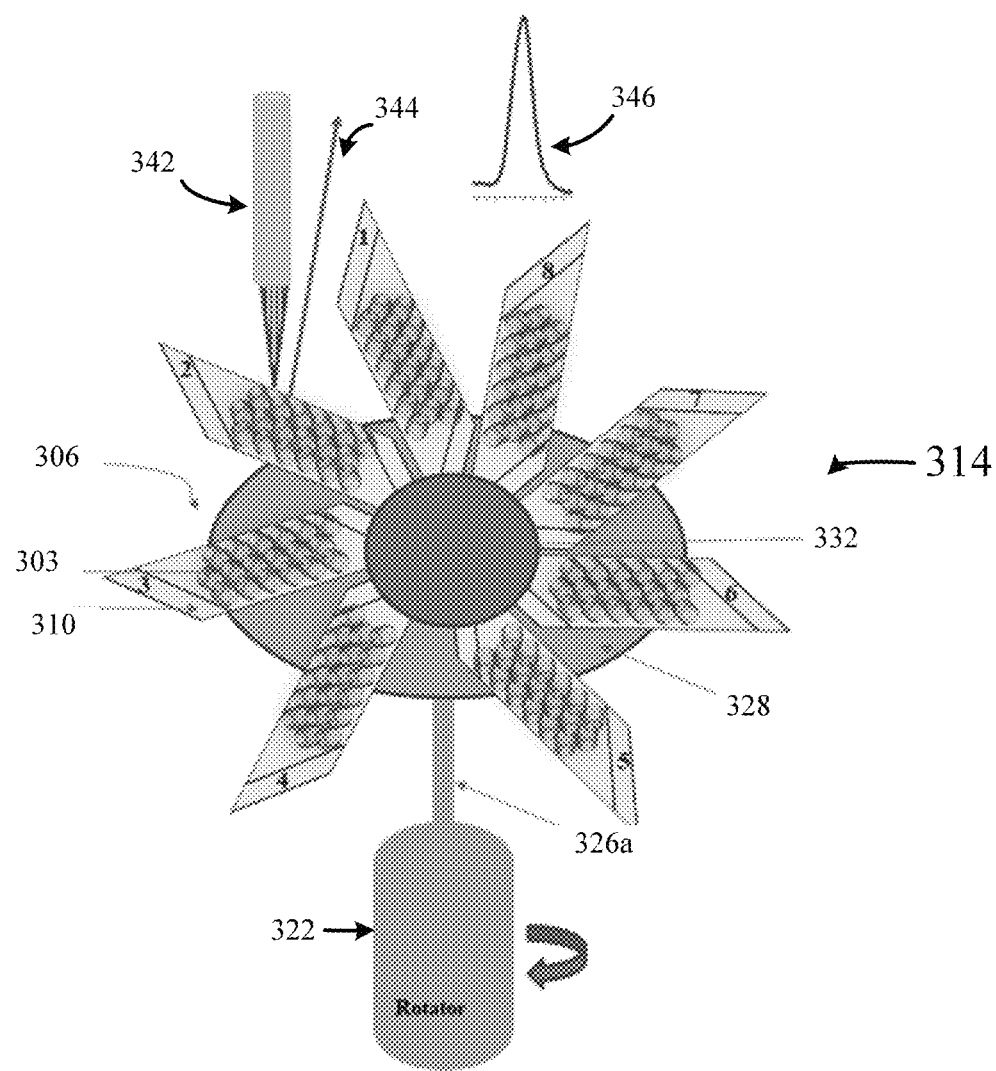
FIG. 3A illustrates an overview of the rotating sample platform system for SERS detection.
Figure 3B:
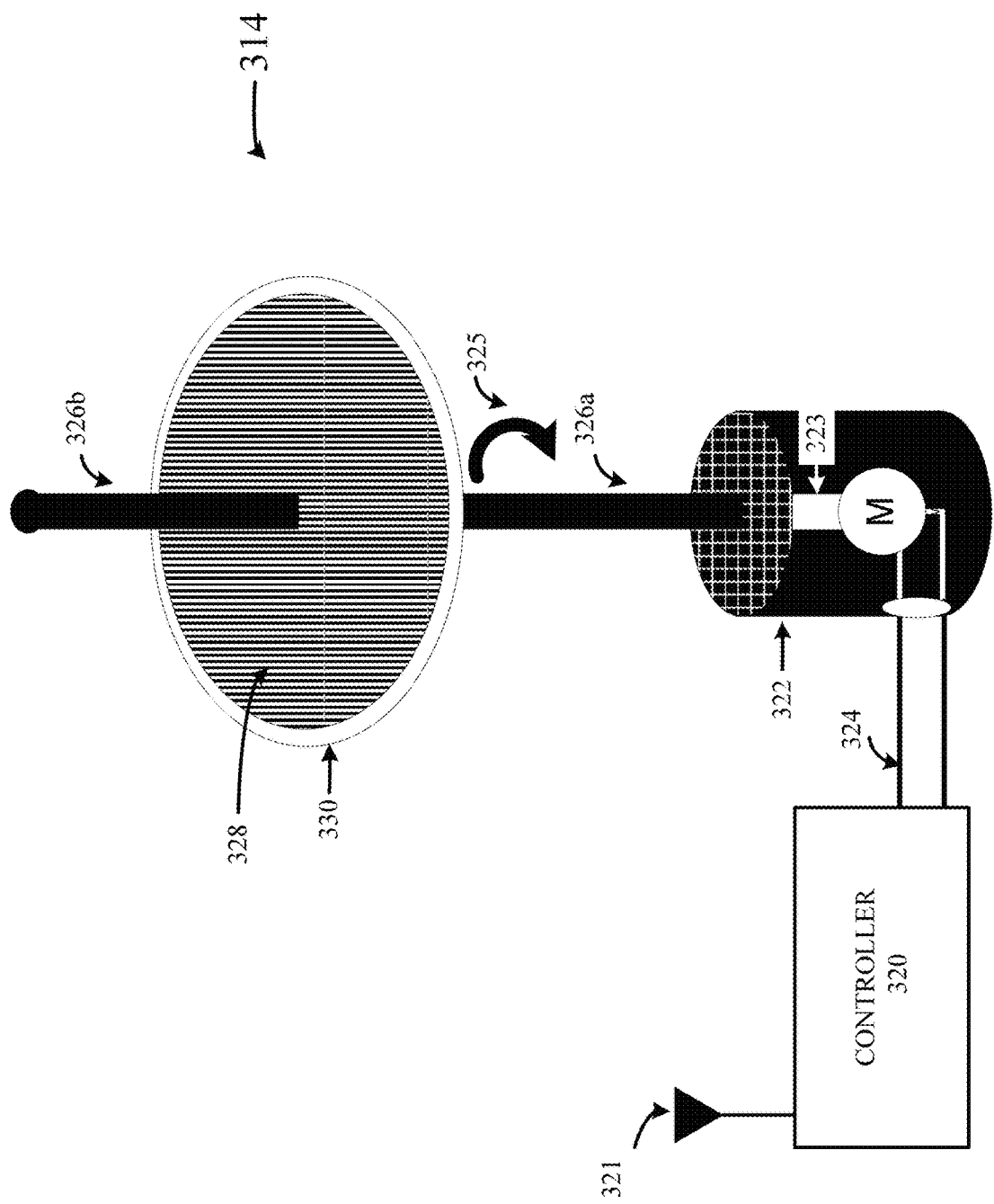
FIG. 3B illustrates the rotating sample platform and electronics.

FIG. 3A-3F illustrate the structure of the rotating sample platform 314. FIG. 3A illustrates an overview of the system. The rotating sample platform includes a rotator 322 equipped with a motor M connected to a controller 320 by wires 324. When the controller provides power to the motor, the motor shaft 323 turns the upright shaft 326a to rotate (as shown by arrow 325) the sample platform 328 as shown in FIG. 3B. Although the arrow 325 depicts clockwise rotation, the controller may reverse the motor to provide counterclockwise rotation.

Figure 3C:
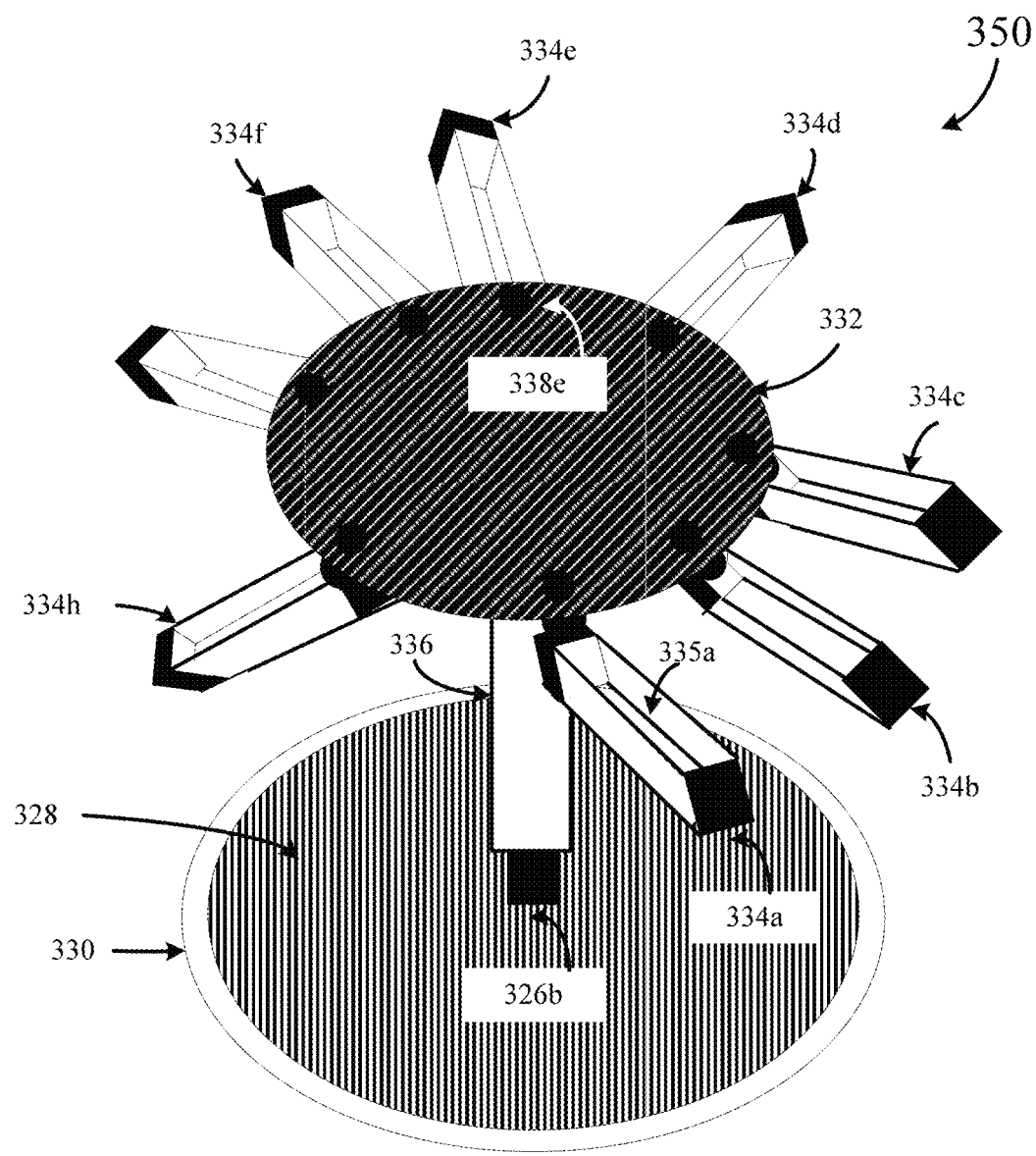
FIG. 3C illustrates the placement of a slide sample holder on the platform.

A sample holder 332 holds slides 310 upon the sample platform 328 (see FIG. 3C). Each slide is rotated by the motor at a specified speed into position below a SERS laser 342, where it remains for a specified dwell time. The scattered output signal 344 is collected by the CCD array of the SERS spectrometer (not shown) and a collection of signals 346 indicating Raman resonances of the scattered signal are detected.

The rotating sample platform is shown in more detail in FIG. 3B, 3C. FIG. 3B shows the bottom portion of the upright shaft 326a protruding through the sample platform 328. The section of the upright shaft above the sample platform is designated 326b. The sample platform 328 includes a raised edge 330, which serves to catch analyte which may drip from the slides. Although shown in FIG. 3C as separated to illustrate the installation of the sample holder onto the upper shaft 326b, the sample holder is pushed down and attached to the sample platform so that the sample holder rotates with the sample platform.

As shown in FIG. 3C, a slide sample holder 350 has a sleeve 336 which fits over the upper shaft 326b. The connection of the sleeve and the upper shaft 326 is preferably a quick release fitting, but may be a mounting bracket, such as a C clamp, which compresses the sleeve 336, a bolt, threading or any other attachment means known in the art.

Each slide 310 is held by a slide support 334 which provides apertures 335 to receive a slide 310. A plurality of sample holder slide supports (334a-h) and apertures (335a-h) (only 335a is shown in FIG. 3C) are installed upon the sample holder 350. The sample holder slide support fixes into the upper section 336b of the upright of the rotator 322.

Figure 3D:
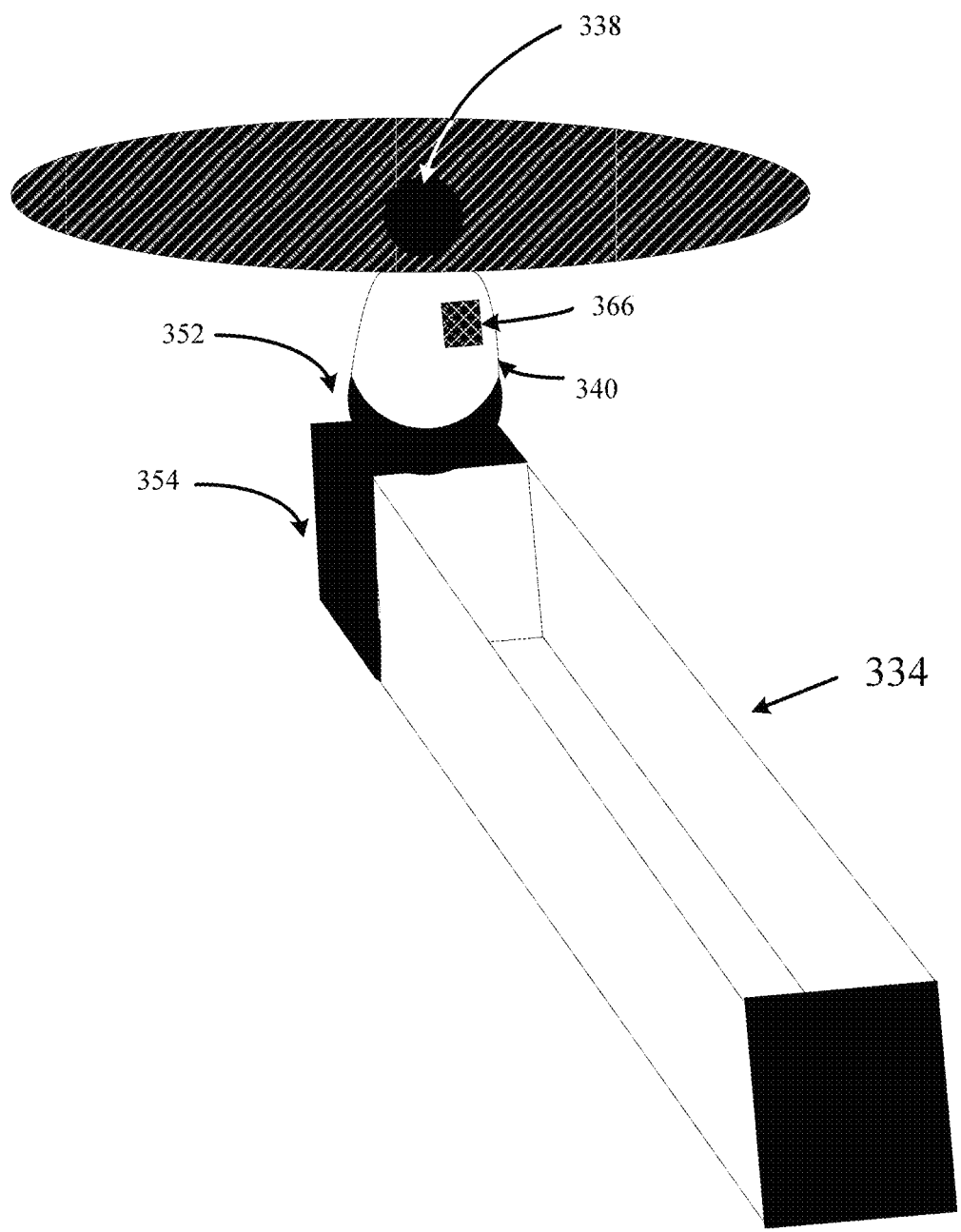
FIG. 3D illustrates a sample holder slide support.
Figure 3E:
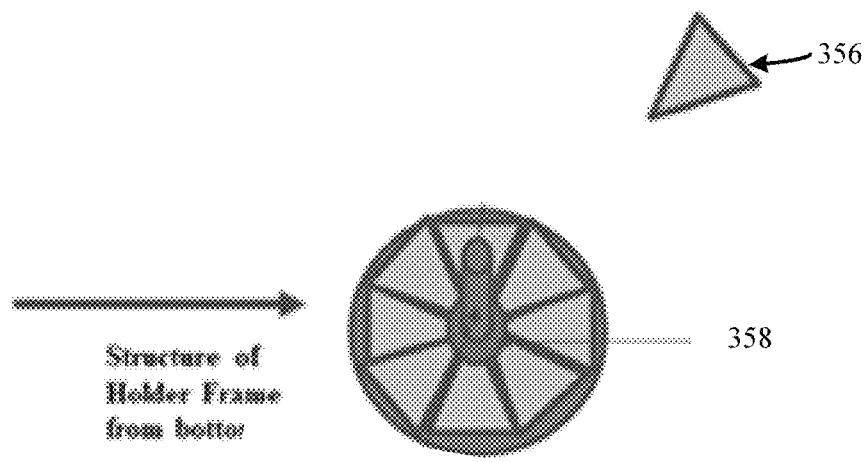
FIG. 3E illustrates a slide frame and the bottom of a slide sample holder.

As shown in FIG. 3C, 3D, each slide holder support 334 has an end 354 which includes a socket cup (not shown). A socket ball 352 is secured into the socket cup and is attached to a ball holder 340 which is connected by a pin 338 to the sample holder 332. The upper end of the pin is threaded and a threaded cap is screwed onto the threaded end of the pin when the pin is inserted in pin hole in the sample holder. The socket ball is configured for 360 degree rotational movement about the axis defined by the pin and is configured to enable the slide holder support to tilt with respect to the pin axis. This arrangement allows the support to be moved into position and also to tilt the slide to allow different angles of incidence of the slide with respect to the laser beam. The aperture may contain a resilient padding (not shown) which holds the end of the slide securely within the support. The resilient padding is preferably rubber, but may be plastic, nylon or other polymer material. Alternatively, the aperture may contain slots (not shown) to hold the end of the slide. The slide may be inserted into a slide frame 356 (See FIG. 3E) which engages with the slots.

In a further aspect, the socket ball holder 340 preferably includes a wireless read head 366 configured to respond to an internal magnetic strip (not shown) of the socket ball 352. The read head is preferably connected to an internal read head battery, wherein the battery provides power to the read head to interogate the magnetic strip and generate the wireless signals.

Fixing all the frames of the slides is achieved by a ring 358 around the round base.

Figure 3F:
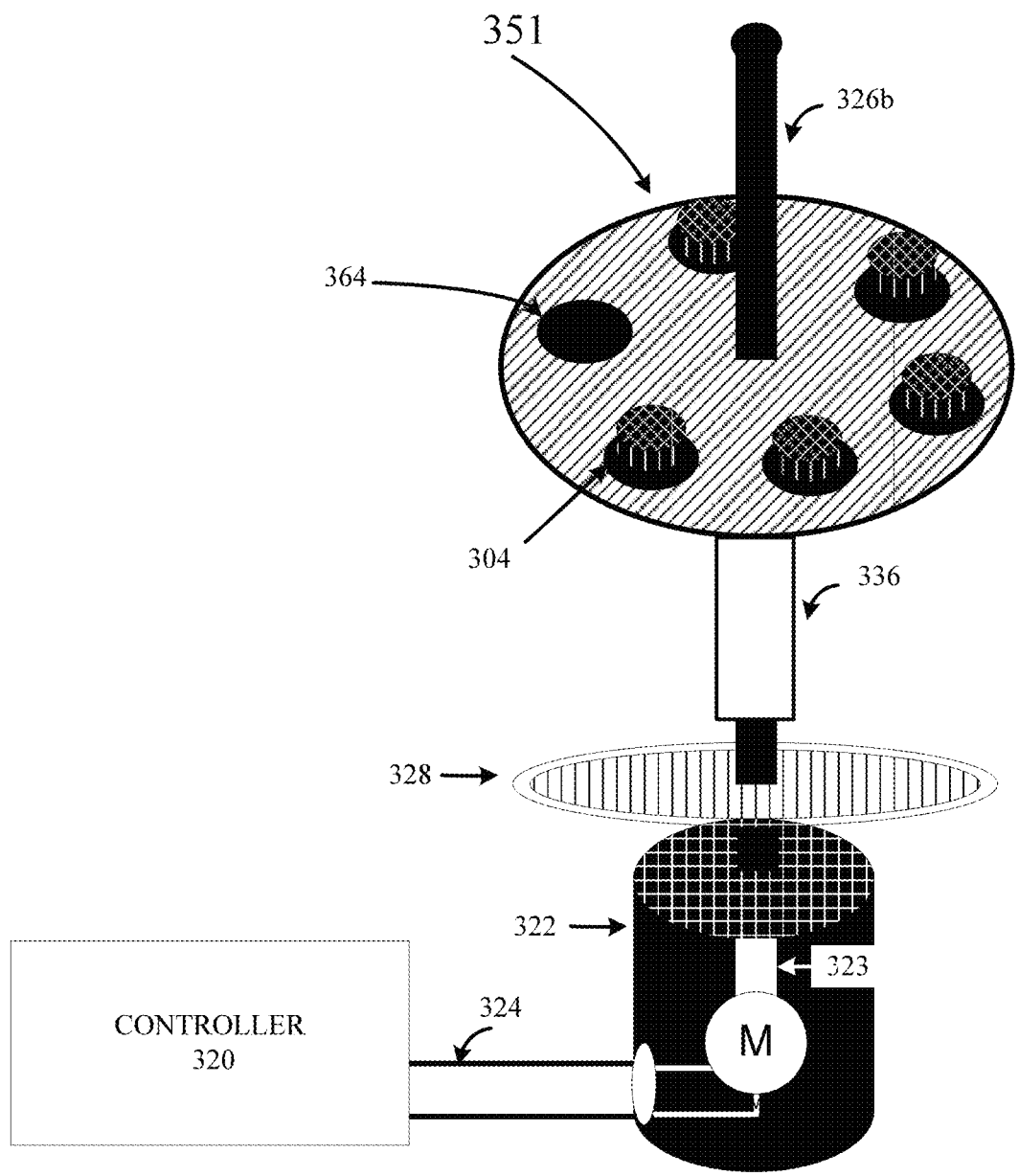
FIG. 3F illustrates the placement of a cuvette sample holder on the platform.

Alternatively, as shown in FIG. 3F, a cuvette sample holder 351 may include circular indentations 364 to hold cuvettes 304 which may include a colloid of nanoparticles 303 into which an analyte 306 may be mixed.

Figure 4:
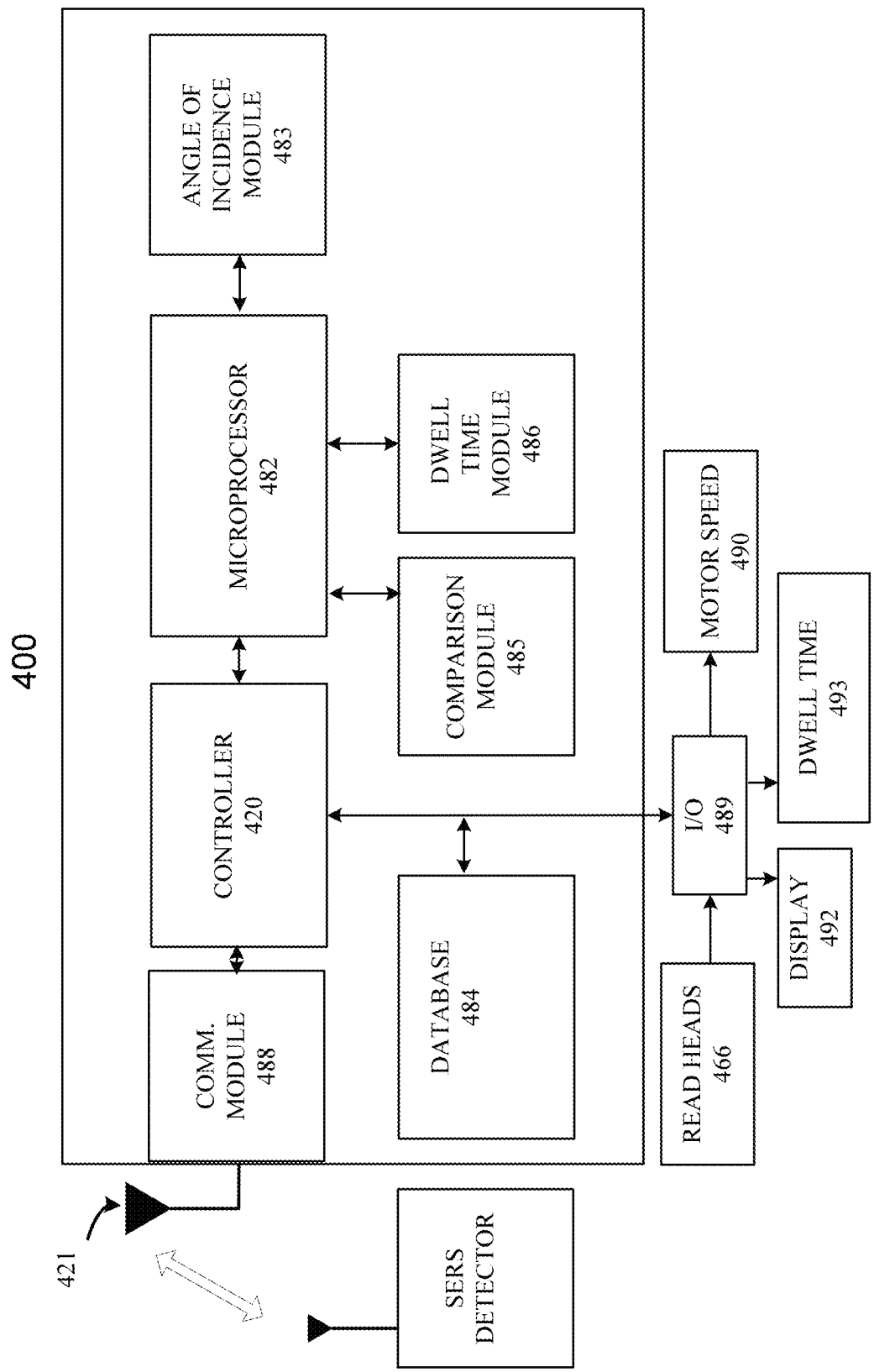
FIG. 4 illustrates a control system.

FIG. 4 illustrates a control system 400 having a controller 420 which controls the motor and interacts with signals from the wireless read heads 466. The control system 400 is further configured to interface wirelessly with the SERS laser device to receive data regarding the resonant signals for each sample. The microprocessor 482 is configured to determine an angle of incidence for each slide from the wireless read head 466 signals and to correlate the angle of incidence with the SERS measurements for that slide. A comparison module 485 compares the SERS measurement and its respective angle of incidence with database records accrued from calibration scans for each analyte type to identify the analyte. The microprocessor sends this information back to the controller 420 which transmits it through the I/O port 489 to the display 492. The microprocessor compares amplitudes of the spectra from the SERS measurement in motor dwell time module 486 against reference amplitude responses for the identified analyte. The motor dwell time module 486 determines whether the dwell time of the sample beneath the laser should be increased or decreased to achieve the reference amplitude. The microprocessor sends this information back to the controller which adjusts the dwell time 493. For example, a short dwell time may provide a spectra acquisition time is too short and a long dwell time may overheat the sample resulting in a sudden drop in scattered spectra.

The rotation of the motor is highly controlled. Each sample is rotated under the laser for a specific dwell time. After the analysis of the sample is completed, the platform rotates the next slide into position for the analysis. As the background is the same for each sample, background corrections may be applied to all of the samples in the set at one time. Further, the detection of all the reference solutions and the samples can be accomplished in a short time and in sequence. Therefore, the background corrections are equal and the error is minimized. Also, there is no significant time lost between the measurements and there is no need to stop the laser after each measurement. This improves the SERS detection of solutions in a series of slides.

The SERS sample holder having a rotating sample platform having a slide holder which holds nanoparticle coated slides at different angular orientations as presented to a SERS laser. The rotating sample platform may alternatively hold cuvettes with nanoparticles mixed with analytes. A SERS calibration sequence using the nanoparticle coated slides or cuvettes may be performed to be used as a comparison with a SERS sequence when an analyte is placed on a series of the nanoparticle coated slides. The rotating sample platform rotator is driven by a stepped motor and includes control electronics as illustrated in FIG. 4 for adjusting the speed and direction of the motor and the measurement time windows.

The first embodiment is illustrated with respect to FIG. 1-4. The first embodiment describes a rotating sample platform 300 for a SERS detector, comprising a rotator 322 having an upright shaft 326, wherein the upright shaft is connected to the rotator and located along a vertical axis of the rotator, a motor having a motor shaft 323, wherein the motor shaft is connected to a base of the upright shaft, a sample platform 328 concentrically located on the upright shaft, wherein the upright shaft is configured to protrude through the sample platform; a sample holder 350 configured to hold a plurality of samples containing nanoparticles 103, wherein the sample holder includes a sleeve 336 configured to fit over the upright shaft and attach to the sample platform; a controller 320 electrically connected to the motor, wherein the controller is configured to actuate the motor shaft to rotate the sample platform; a SERS detector having a laser configured to direct a light beam 342 to each sample in the sample holder as the sample is positioned beneath the laser beam and to analyze scattered light 346 from the sample.

The sample holder may be configured to hold slides, wherein each slide is coated with one of a plurality of gold and a plurality of silver nanoparticles.

Referring to FIG. 3D, the sample holder is connected to a plurality of slide supports 334, each slide support having an aperture 335 configured to hold a slide 310, wherein each slide support is configured to tilt the slide to any one of a plurality of angles. In order to tilt the slide support, each slide support comprises a socket cup at a first end (within 354), a socket ball 352 located within the socket cup, wherein the socket ball includes an internal magnetic strip (not shown), a socket ball holder 340 configured to fit over and hold an upper portion of the socket ball, the socket ball holder including a read head 366 configured to sense the magnetic strip and generate wireless signals, the socket ball holder further comprising a pin with a threaded end (not shown). A plurality of pin holes in an outer radial area of the sample holder 350, wherein a threaded cap 338 is configured to secure the threaded end of the pin when the pin is inserted into one of the pin holes.

The controller includes circuitry and a processor 482 having program instructions configured to receive the wireless signals from each read head and determine a tilt angle of each slide support, wherein the controller is further configured to display the tilt angle of each slide support. The controller is configured to rotate the motor shaft at a specified speed, and is further configured to stop the rotation of the motor shaft for a specific dwell time when a slide is beneath the laser beam. The controller is further configured to receive SERS spectra from the SERS detector and analyze the SERS spectra to determine corrections to the specified speed and specified dwell time.

Each aperture of the slide may be further configured with a resilient padding which holds an end of a slide within the aperture. Alternatively, each slide may be inserted into a slide frame, wherein each aperture is further configured with slots for engaging with an end of the slide frame.

In another alternative, the sample holder may be configured to hold cuvettes as shown in FIG. 3F, wherein each cuvette contains an emulsion including one of a plurality of gold and a plurality of silver nanoparticles. The sample holder comprises circular indentations 364 concentrically located and evenly spaced near the radial outer surface of the slide holder, wherein each indentation is configured to hold a cuvette 304.

In this alternative, the controller is configured to rotate the motor shaft at a specified speed, and is further configured to stop the rotation of the motor shaft for a specific dwell time when a cuvette is beneath the laser beam, wherein the controller is further configured to receive SERS spectra from the SERS detector and analyze the SERS spectra to determine corrections to the specified speed and specified dwell time.

The second embodiment is illustrated with respect to FIG. 1-4. The second embodiment describes a method for combining a rotating sample platform 300 with SERS detection, comprising coating a plurality of surfaces with a plurality of gold or a plurality of silver nanoparticles 103 to form a plurality of coated surfaces, placing an analyte 106 on each coated surface to form a plurality of analyte coated surfaces, placing each analyte coated surface (104 or 108) into a sample holder (350 or 351) attached to the rotating sample platform, consecutively radiating a laser beam 342, with a SERS detector, onto each analyte coated surface, detecting, with the SERS detector, Raman spectra of each analyte coated surface, and generating, with a controller 320 including processing circuitry 482 configured for analyzing the Raman spectra, a calibration curve for each analyte coated surface.

The plurality of nanoparticles may be gold nanoparticles and the analyte may be procaine.

The plurality of nanoparticles may silver nanoparticles, wherein the silver nanoparticles are hydroxylamine-reduced silver colloid, and wherein the analyte may be one of phenanthrene, naphthalene and valeric acid.

The silver nanoparticles may be silver loaded graphene and the analyte may be thiouracil.

The coated surface may be is a slide 310, wherein the method includes rotating, with the controller 320, the sample platform 328, by actuating a motor shaft 323 connected to the sample platform in a specified speed and dwell time pattern, the controller (320, 420) receiving through antenna 421, read head signals 366 regarding a tilt angle of each slide, displaying (on display 492) the tilt angle of each slide, receiving, by the controller, the Raman spectra of the analyte on each slide from the SERS detector, and analyzing, by processing circuitry 482 of the controller, the Raman spectra and tilt angle of each slide to determine corrections to the specified speed and dwell time pattern, actuating, with the controller, the motor in a corrected speed and dwell time pattern.

In an aspect, the plurality of analyte coated surfaces are slides 310, wherein the method includes placing each slide 310 within a slide receiving aperture 335 of a slide support 334, tilting each slide support by a different number of degrees with respect to a direction of the laser beam, rotating, by the motor, the sample holder 328 beneath the laser beam for a specified dwell time, detecting, with the SERS detector, the amplitudes of the Raman spectra of each slide, determining, by the processing circuitry of the controller, the tilt angle which generates the greatest amplitude of the Raman spectra.

In an alternative, the coated surface may be a cuvette, wherein the method includes rotating, with the controller, the sample platform by actuating a motor shaft 323 connected to the sample platform in a specified speed and dwell time pattern, receiving, by the controller, the Raman spectra of the analyte on each cuvette, analyzing, by processing circuitry of the controller, the Raman spectra of each cuvette to determine corrections to the specified speed and dwell time pattern, actuating, with the controller, the motor in a corrected speed and dwell time pattern.

The method further comprises placing an unknown analyte upon the coated surface to form an unknown coated surface, placing the unknown coated surface in a sample holder with a plurality of known analytes, actuating the motor to rotate each coated surface beneath a SERS laser and generating Raman spectra for each coated surface, comparing, by processing circuitry of the controller, the Raman spectra of the unknown coated surface to the Raman spectra of each known analyte, identifying the unknown analyte by matching its Raman spectra to that of a known analyte.

Experiments were conducted in which silver nanoparticles, gold nanoparticles, silver nanoparticles loaded on graphene and gold nanoparticles loaded on graphene were synthesized as shown below. The materials were used as SERS substrates in different designs including cuvettes and coatings on slides.

AgNPs were prepared by a modified reduction method. First, a solution of 0.1 M silver nitrate was prepared by dissolving $AgNO_3$ in 250 ml of deionized water, followed by heating the solution at 90° C. Then, 10 ml of a 0.5% solution of trisodium citrate dihydrate was added at a rate of 1 drop/sec to the solution while stirring. After adding 5 ml of the trisodium citrate dihydrate solution, the solution color turned yellow. The solution was boiled for one hour, until the color of the solution changed to a greenish yellow. The nanoparticles were collected by sonication.

AuNPs were prepared by a chemical reaction method as follows. About 100.0 ml of a 0.1 M aqueous $HAuCl_4$ was boiled on a hot plate while stirring. Then, 10.0 ml of sodium citrate (0.5 M) was rapidly added to the boiling gold solution. The solution color turned gray-blue within 60 sec. After 2 min, the color of the mixture solution changed to red-violet. Then, the solution was kept under heating for 10 min. Finally, the heating source was removed, and the solution was allowed to cool to room temperature.

The surface-enhanced Raman spectroscopy (SERS) spectra of the analytes were obtained by using a Raman spectroscopy system Lab Ram HP Evolution Raman spectrometer equipped with an internal He—Ne 17 mW laser at a 633 nm excitation wavelength. The laser was used at 10% power for the sample. SERS samples were prepared by using a 3:1 volume ratio of the analyte solutions to nanoparticles dispersed in a colloid. A 10× objective was used for focusing the laser beam to the solution. The data acquisition time (dwell time) was 30 seconds with one accumulation for the collection of each SERS spectra.

Three preliminary experiments were conducted:
1. A cuvette with the dimensions of a 1 cm radius and 2 cm in height was designed, as illustrated in FIG. 1B, and used as a sample cell for the Raman spectra (see FIG. 1C). The SERS spectra were obtained in the range from 400-2000 $cm^{-1}$.

2. A solid sample 210 was prepared by adding a small amount of the analyte 206 in solid form on to a glass slide for obtaining a baseline spectrum using a laser λ 633 nm, an acquisition time of 30 sec and objective 10× as shown in FIG. 2A.

3. The nanoparticles were prepared and coated on slides. Once dry, the slides were used as substrates for SERS, as shown in FIG. 2B, 3A. In this example, slide 1 may have a blank solution with no analyte; slides 2 to 6 may be used for standard (known) solutions to create calibration curves; slides 7 and 8 may be used for unknown analyte samples. More slides can be added if more samples are to be analyzed.

The rotating sample platform 328 holds the slide sample holder 350 loaded with slides or cuvettes 304 and rotates them one by one to beneath the laser beam for detection and analysis of targeted molecules.

The slides were coated with SERS sensitive nanomaterials such as gold, silver, or copper or mixtures thereof composed of nanoparticles that are SERS sensitive. The targeted molecules/compounds to be characterized or analyzed were added to the surface.

The cuvettes contained solutions/colloids/mixture of SERS sensitive nanomaterials such as gold, silver, or cupper or mixtures thereof composed of nanoparticles that are SERS sensitive. The targeted molecules/compounds to be characterized or analyzed were added into the cuvettes. Cuvettes are used when liquid nanoparticles are used in which targeted molecules of an analyte are added for SERS analysis. It may be advantageous to use cuvettes when there is a large quantity of analyte or when time is limited for preparing slides.

The rotating sample holder allows multiple sample analysis at the same time as calibration, thus minimizing the % error due to sample preparation, lighting conditions and other noise sources. For example, a first cuvette or slide may contain nanoparticles but no analyte. A second, third and fourth cuvette or slide may each contain a different known substance. A fifth and sixth slide may contain analyte samples suspected of having one of the known substances. Each cuvette or slide may be analyzed in a continuous run under the same operating conditions, which minimizes the error.

In a further example, slides prepared with nanoparticles and the same analyte may be placed at different angular orientations in sample holder 350 and interrogated by the SERS detector. A preferred angle of incidence may be determined by comparing the amplitudes of spectral plots from each sample. The preferred angle of incidence at a particular resonance frequency and the amplitude at the resonant frequency may then be matched to records (by comparison module 485) stored in database 484 to identify the analyte. Alternatively, in a calibration of the system, the records of a known analyte may be added to the database to be used in future detection of unknown analytes.

In another example, an analyte placed on a plurality of slides held at different angles by the slide sample holder may be presented to the SERS detector. The spectra at different angles of incidence may then be compared with database records of known analytes each having their spectra stored with its preferred angle of incidence. A high level of detection accuracy is achieved, as different spectral peaks may have higher amplitudes at specific angles of incidence.

Experiments were conducted using the rotating disc to present the cuvettes or slides to the SERS spectrometer. One of the benefits of using the rotating disc platform is that a series of samples can be evaluated continuously under the same background conditions without stopping the measuring. Additionally, no sample is overheated by repeated scans, so the samples are not subject to the damage of stationary sample stages. Most importantly, slides may be presented at different angles to the laser, which provides SERS detection for different incident angles, without having to move the laser itself. This allows the sample to be interrogated at different depths, thus giving a three dimensional sample response.

The LabRAM HR Evolution Raman system equipped with an internal HeNe 17 mW laser was used for all experiments. Up to two laser entrances can be used: E1 for an internal laser and E2 for an external laser. The microscope was coupled confocally to an 800 mm focal length spectrograph equipped with two switchable gratings (76×76 mm gratings, 1800 gr/mm and 600 gr/mm). The laser beam was set to the optic fiber going to the probe using the 10× objective of the microscope. A 1024×256 pixels—TE-Cooled CCD detector for ultraviolet to visible to near field internal reflection (UV-Vis-NIR) was used to achieve signal detection. The data acquisition time was the 30 s and an accumulation of 2 was used for spectral collection for all samples. In non-limiting examples, the spectrometer may be the LabRAM HR Evolution Raman manufactured by Horiba Scientific, 20 Knightsbridge Rd, Piscataway, N.J., U.S.A. and the TE-Cooled CCD detector may be the Glacier X TE Cooled CCD spectrometer available from B&W Tek, 19 Shea Way, Newark, Del., U.S.A.

1. Methods of Detection of Naphthalene and Phenanthrene

A stock solution of 0.1 M concentration of naphthalene and phenanthrene in water was prepared. Lower concentrations of the compound were prepared by diluting the stock solutions and were used for the SERS measurement.

Raman spectra were obtained using a 633 nm excitation wavelength. The cuvettes for the Raman spectra were quartz cylinders 1 cm thick and 1 cm in diameter.

SERS samples were prepared by using a 1:10 volume ratio of the naphthalene and phenanthrene stock solution to silver colloid (mixing 300 µL of the silver colloid and the 30 µL of the samples) as shown in FIG. 1.

The experiments were focused on the quantitative detection of phenanthrene and naphthalene at various concentrations using a hydroxylamine-reduced silver colloid (HRSC) as the enhancement mechanism.

The samples were placed on the rotating sample platform illustrated in FIG. 3F and presented to the SERS laser for a data acquisition time of 30 seconds with one accumulation for the collection of each SERS spectra. After 30 seconds, the rotating disc platform was actuated to move each next sample in position until the series of samples were interrogated.

The average characteristic Raman peaks observed in the SERS spectra of naphthalene were at 801 $cm^{-1}$, 916 $cm^{-1}$, 1124 $cm^{-1}$, 1172 $cm^{-1}$, 1242 $cm^{-1}$, and 1389 $cm^{-1}$. Other peaks 391 $cm^{-1}$, 500 $cm^{-1}$, 575 $cm^{-1}$, 721 $cm^{-1}$, 1015 $cm^{-1}$, 1323 $cm^{-1}$ and 1578 $cm^{-1}$ were also observed in the spectra of $10^{-7}$ M and $10^{-8}$ M concentrations. For phenanthrene, the average characteristics Raman peaks observed in the SERS spectra were at 659 $cm^{-1}$, 916 $cm^{-1}$, 1015 $cm^{-1}$, 1138 $cm^{-1}$, 1173 $cm^{-1}$, 1242 $cm^{-1}$, 1322 $cm^{-1}$, 1392 $cm^{-1}$, and 1577 $cm^{-1}$. Other Raman peaks were only observed in the spectra of $10^{-7}$ M and $10^{-8}$ M concentrations are the 393 $cm^{-1}$, 501 $cm^{-1}$, 537 $cm^{-1}$, 714 $cm^{-1}$ and 1066 $cm^{-1}$.

The SERS spectra of the aqueous naphthalene and phenanthrene samples at the $10^{-7}$ M and $10^{-8}$ M concentrations show similar Raman shifts as that of an ethanol solution of naphthalene and phenanthrene.

For lower concentrations than the $10^{-8}$ M for both naphthalene and phenanthrene, the Raman peaks of the SERS spectra appear very weak in comparison to the $10^{-7}$ M and $10^{-8}$ M concentrations, thus a concentration of $10^{-8}$ M is determined to be the lower limit of detection (LoD). In addition, some wave numbers were observed to shift to lower frequencies in the SERS spectra of concentrations less than the $10^{-8}$ M for aqueous naphthalene and phenanthrene solutions in comparison to the $10^{-7}$ M and $10^{-8}$ M for the analytes in ethanol. The SERS spectral peaks for the ethanol solution of both naphthalene and phenanthrene were observed to be more enhanced and also exhibit lower limits of quantification (LoQ) than that of their aqueous sample solutions. This may be due to the uniform distribution of the molecules of ethanol solution of phenanthrene and naphthalene, which are very soluble in ethanol but almost insoluble in water.

Figure 5A:
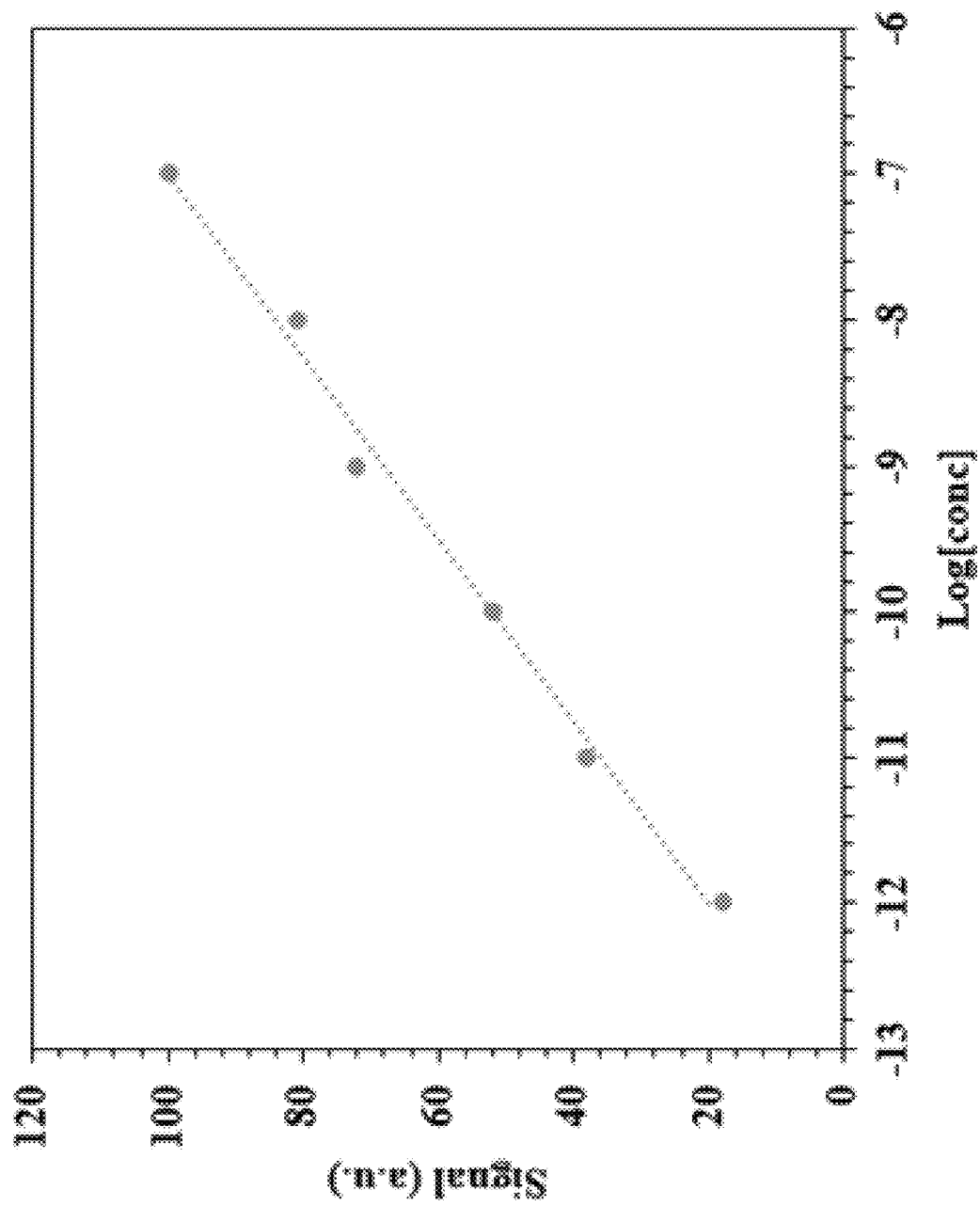
FIGS. 5A-5B are graphs illustrating an aqueous solution of (a) naphthalene SERS intensities at 1174 $cm^{-1}$ as a function of naphthalene concentrations (b) phenanthrene SERS intensities at 1372 $cm^{-1}$ as a function of concentrations.
Figure 5B:
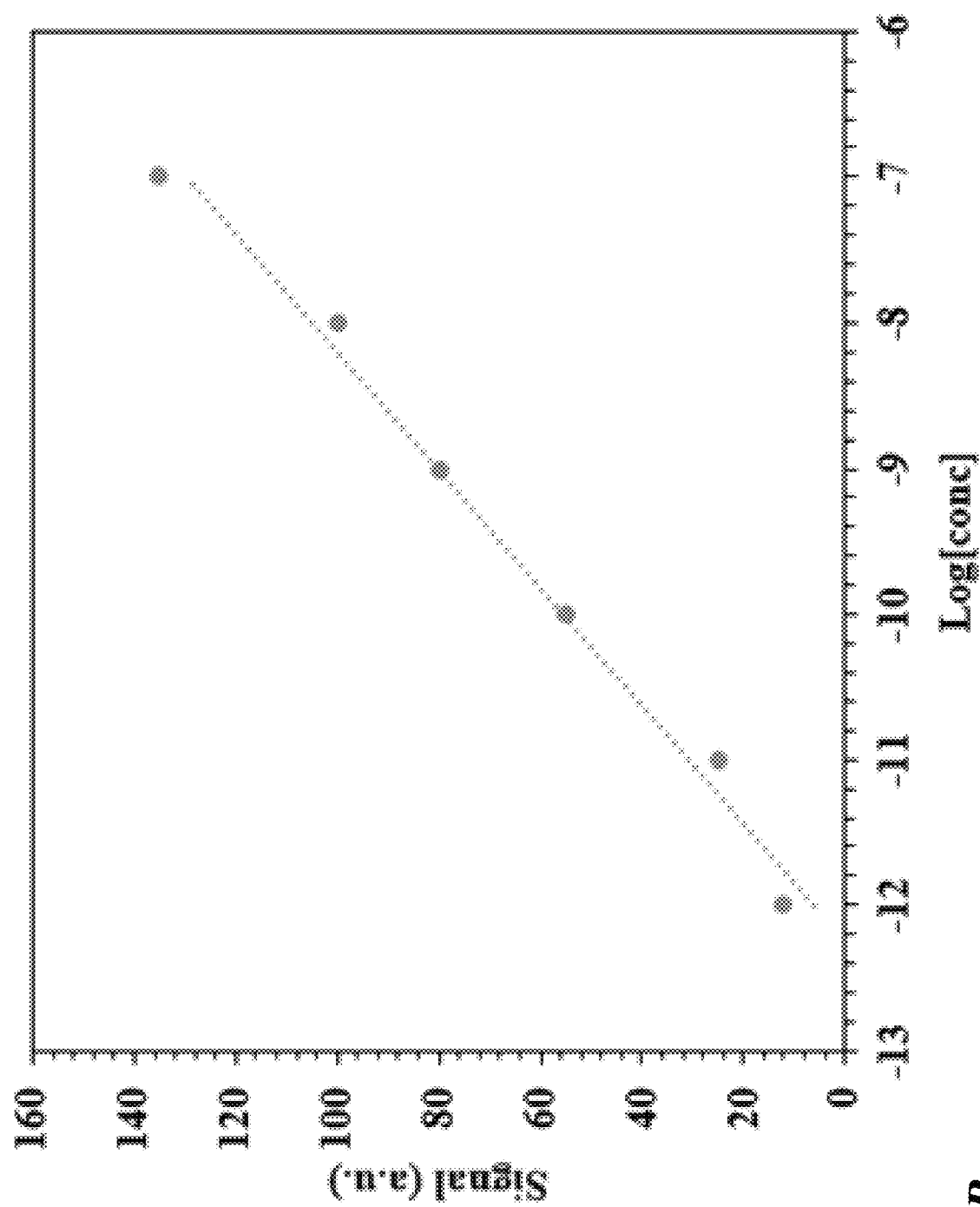

Plots of the SERS spectra of aqueous naphthalene and phenanthrene were calculated. FIG. 5A shows the plot of an acqueous solution of naphthalene at SERS intensities in a.u. at 1174 cm$^{-1}$ as a function of naphthalene concentration (shown on logarithmic scale). A line represented by y=15.971x+8.9 was fitted to the data and the R$^2$ linear determination coefficient was 0.9927. FIG. 5B shows the plot of an acqueous solution of phenanthrene at SERS intensities in a.u. at 1372 cm$^{-1}$ as a function of phenanthrene concentration (shown on logarithmic scale). A line represented by y=24.714x−5.2 was fitted to the data and the R$^2$ coefficient was 0.9887.

The calibration plots for the aqueous naphthalene and phenanthrene solutions were plotted at concentrations of ($10^{-7}$ M to $10^{-12}$ M) for naphthalene and for phenanthrene. The high correlations between the Raman intensity and concentration were noted.

2. Methods of Detection of Thiouracil

Graphene oxide (GO) was used for the preparation of silver loaded graphene (Ag/G).

(i) About 13.5 mg of the prepared GO was dispersed in 20 mL de-ionized water by sonication in an ultrasound bath for 30 mins.

(ii) To this mixture, 5 mL of AgNO$_3$ solution (1 mM) was added. This mixture was sonicated for an additional 30 mins. The reaction mixture was stirred for 30 mins at room temperature before the addition of the reducing agent.

(iii) 5 mL of a freshly prepared solution of sodium borohydride NaBH$_4$ (1 mM) was slowly added, at a rate of 1 drop/sec, to the mixture while stirring. Steps (ii) and (iii) were repeated five times to obtain silver nanoparticles seeded on graphene nanosheets, and thus, a uniform distribution of the silver nanoparticles was achieved. The color of the solution turned deep brown, and the reaction mixture was continuously stirred at room temperature for 12 hours. Next, the product was collected by centrifuging at 10000 rpm/min for 30 mins and then dried.

Figure 6:
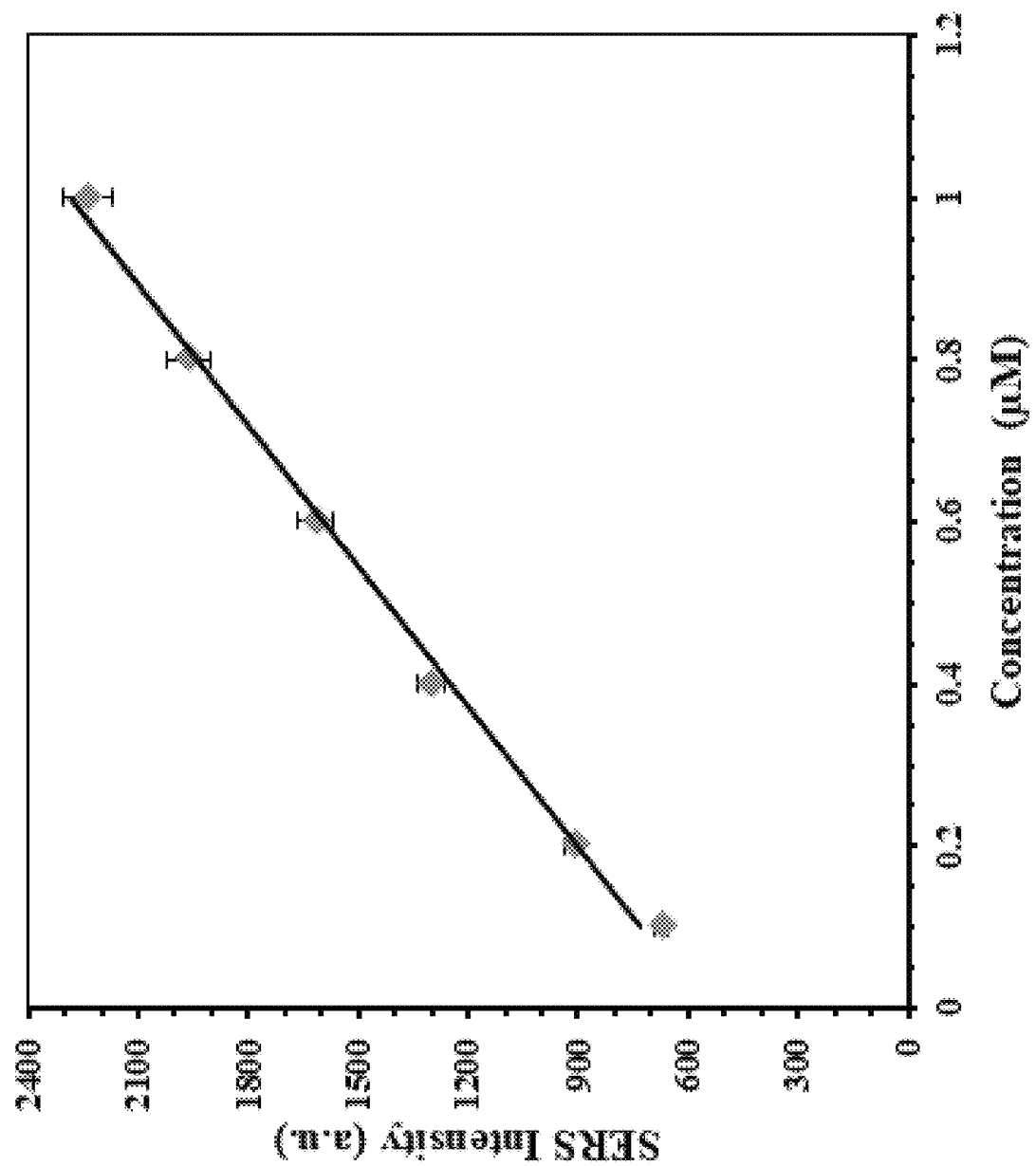
FIG. 6 is a graph illustrating the SERS calibration curve of thiouracil for the band at 815 $cm^{-1}$.

A calibration curve for quantitative detection was first determined. The most enhanced band at 815 cm$^{-1}$ in SERS was selected for obtaining the qualitative information. The SERS measurements were performed by using the HeNe 17 mW Laser at λ=633 nm, 10% power was used, acquisition time 30 sec, and objective 10×. As illustrated in FIG. 6, the intensities of the SERS spectra increase with increasing concentration of 2-Thiouracil, thus the SERS intensities are proportional to the quantity of 2-Thiouracil molecules. The minimum concentration of 2-Thiouracil observable by enhancement on silver loaded graphene was lower than $10^{-8}$ M. The SERS intensity of the vibration frequency at 815 cm$^{-1}$ versus the concentration of 2-Thiouracil solution was used to establish the calibration curve. For the band at 815 cm$^{-1}$, the SERS signal intensities showed a linear relationship with 2-Thiouracil concentrations with a dynamic range between 1 μM to 0.1 μM with a linear determination coefficient (R$^2$) of 0.9995. The results were compared with those documented in the literature in term of calibration range, detection limits, and determination coefficient (R$^2$). For the same calibration range and linear determination coefficient R$^2$, the results of the present disclosure have a detection limit (DL) of 10 nM which is comparable to other detection methods, such as SWV square wave voltammetry (DL 0.02 μM), voltammetry determinations (40 μM) and high-performance liquid chromatography (DL 0.43 μM).

3. Methods of Detection of Valeric Acid

The SERS laser/detector was employed to quantitatively detect valeric acid at different concentrations using hydroxylamine-reduced silver colloid (HRSC) as a substrate, as presented to the laser on the rotating platform.

Figure 7A:
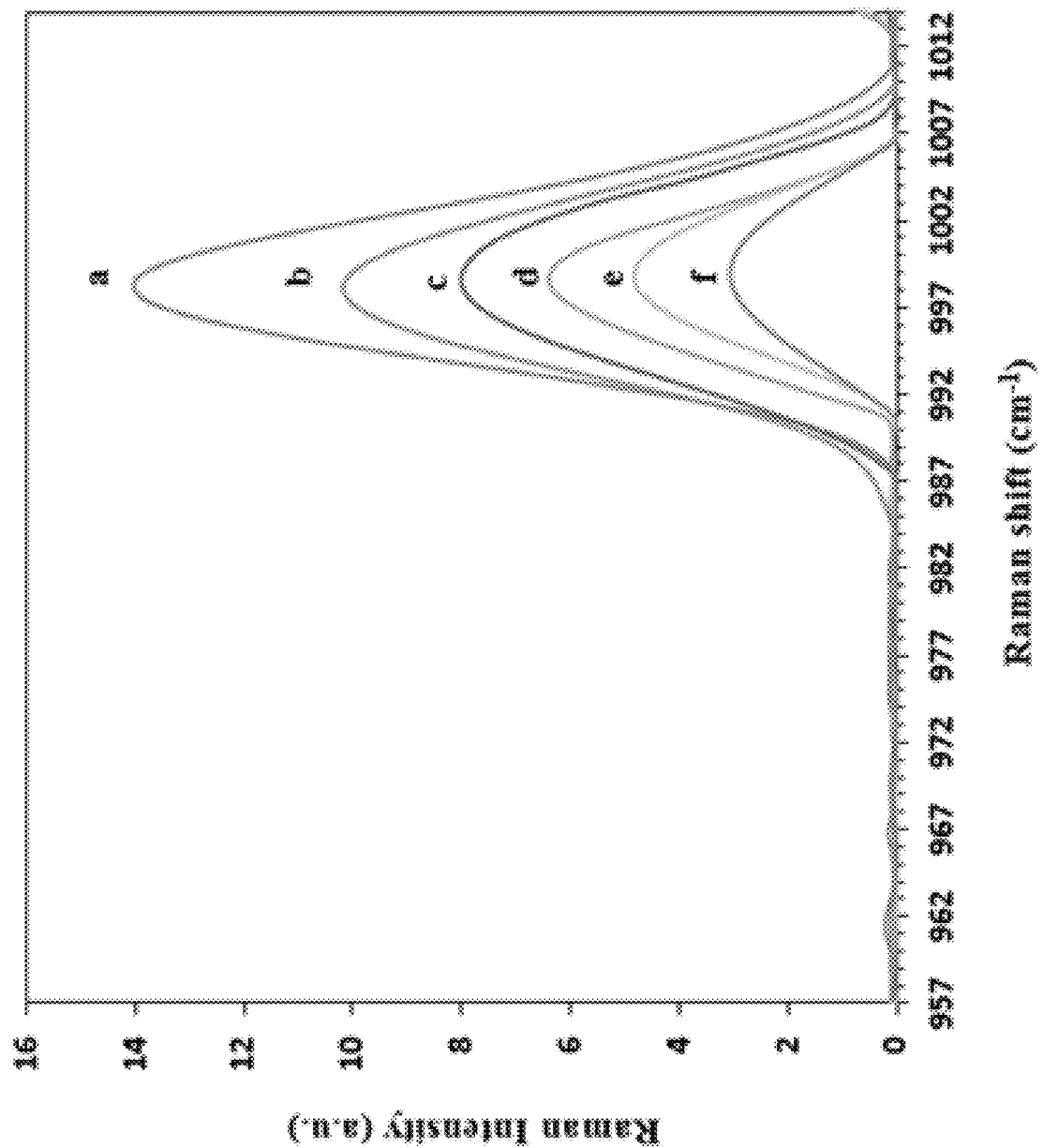
FIG. 7A is a graph illustrating SERS spectra of valeric acid at different concentrations (a) $10^{-2}$, (b) $10^{-3}$, (c) $10^{-4}$, (d) $10^{-5}$, (e) $10^{-6}$, (f) $10^{-7}$ in Mol/L).
Figure 7B:
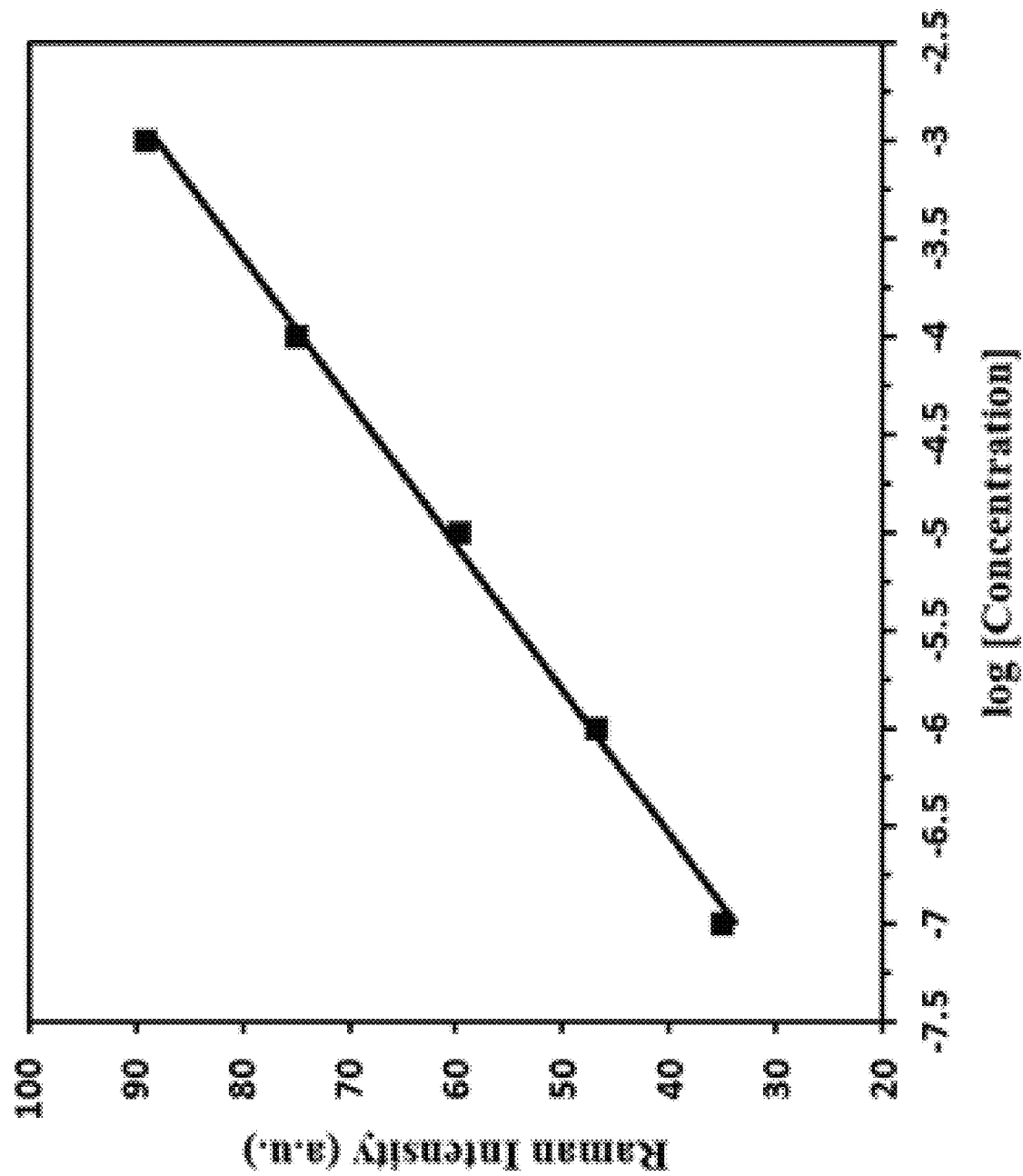
FIG. 7B is a graph illustrating a calibration curve of the band at 1020 $cm^{-1}$.

In analyzing the results of the SERS experiment, the bands found between 1074 cm$^{-1}$ and about 1000 cm$^{-1}$, corresponding to C—O and C—C stretching respectively, were identified as the most enhanced and symmetric bands. As such, they were used for the qualitative detection of the valeric acid in solution. FIG. 7A is a graph illustrating the SERS spectra of valeric acid at different concentrations (a) $10^{-2}$, (b) $10^{-3}$, (c) $10^{-4}$, (d) $10^{-5}$, (e) $10^{-6}$, (f) $10^{-7}$ in Mol/L). The SERS measurements were taken using a red Laser of λ=633 nm, lase power of 50%, acquisition time of 50 s, accumulation of 64, objective of 10×, and range of spectra equal to 950-1110 cm$^{-1}$. The results show that the intensity of SERS spectra was enhanced by the presence of the nanoparticle substrate. Moreover, the results indicate a direct relationship between the SERS intensity and the amount of valeric acid in solution. Within the dynamic range for the vibrational wavenumber at band 1002 cm$^{-1}$, the minimum concentration of valeric acid observed was $10^{-7}$ M. The calibration curve at this frequency was established by plotting SERS intensities against the logarithmic concentration of valeric acid in aqueous medium. The resultant curve shows the linear relationship for the dynamic range of $1\times10^{-7}$ to $1\times10^{-2}$M, as illustrated in FIG. 7B, with 0.995 correlation coefficient (R$^2$). The physical detection limit was found to be $1\times10^{-10}$ M (not shown on the calibration curve). The calibration curve of the band at 1020 cm$^{-1}$ was established under conditions of laser λ=633 nm, lase power; 50%, acquisition time; 50 s, accumulation; 64, objective; 10×, and range of spectra; 957-115 cm$^{-1}$.

The enhancement obtained by SERS using Ag as the substrate can be explained by the interaction between Ag and the valeric acid molecules. There are two enhancement mechanisms, i.e. electromagnetic mechanism, and chemical mechanism. The electromagnetic enhancement of the incident and scattered fields occurs when the scattering is in the enhanced local optical fields of the silver substrate. The chemical or electronic enhancement occurs when the incident light excites charge transfer resonances between the silver and the valeric acid molecules. The interaction between valeric acid molecules and the Ag substrate, as illustrated in FIGS. 7A and 7B, displays a large Raman process at a cross-section of interaction compared to the Raman cross section of valeric acid without the Ag substrate.

4. Detection of Procaine

The HORIBA Scientific LabRAM HR Evolution Raman spectrometer was used to accumulate the Raman and SERS spectra of procaine. For the SERS study, a He—Ne laser source working at 17 mW and 633 nm excitation wavelength with 50% laser power at the sample solution was used. The spectra were collected for a 1:1 volume ratio of procaine and the gold nanoparticles. A 10× objective lens was used to focus the laser into the sample solution. The microscope was coupled with a 600.0 mm focal length spectrograph equipped with two switchable gratings. An acquisition time of 10 sec with 100 accumulations was set for the SERS spectra collection. A cuvette of a quartz cylinder with dimensions of 1 cm radius and 1 cm height was used as a sample cell.

Figure 8A:
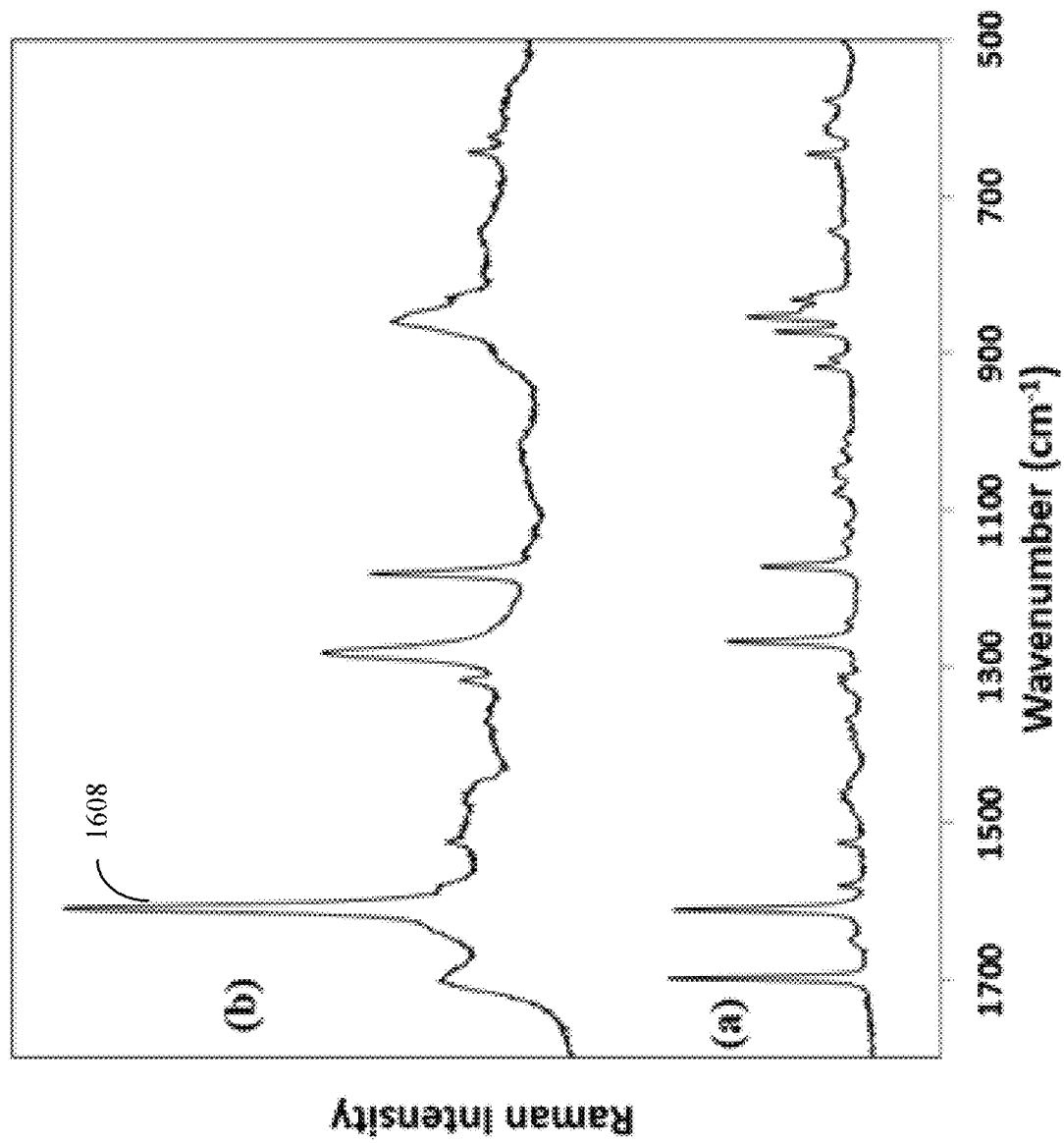
FIG. 8A is a graph illustrating the comparison between the Raman spectrum of (a) solid procaine and (b) the SERS spectrum of 0.1 M procaine solution with AuNP, both in the region 500-1800 $cm^{-1}$.

The Raman spectrum collected for solid procaine in the vibrational range of 500-4000 $cm^{-1}$ is depicted in FIG. 8A, which illustrates the comparison between (a) the Raman spectrum of solid procaine in the lower vibrational region and (b) the SERS spectrum of 0.1 M procaine solution with gold nanoparticles (AuNP) for a wavenumber range of 500-1800 $cm^{-1}$ with a volume ratio of 1:1 in the higher vibrational region.

Figure 8B:
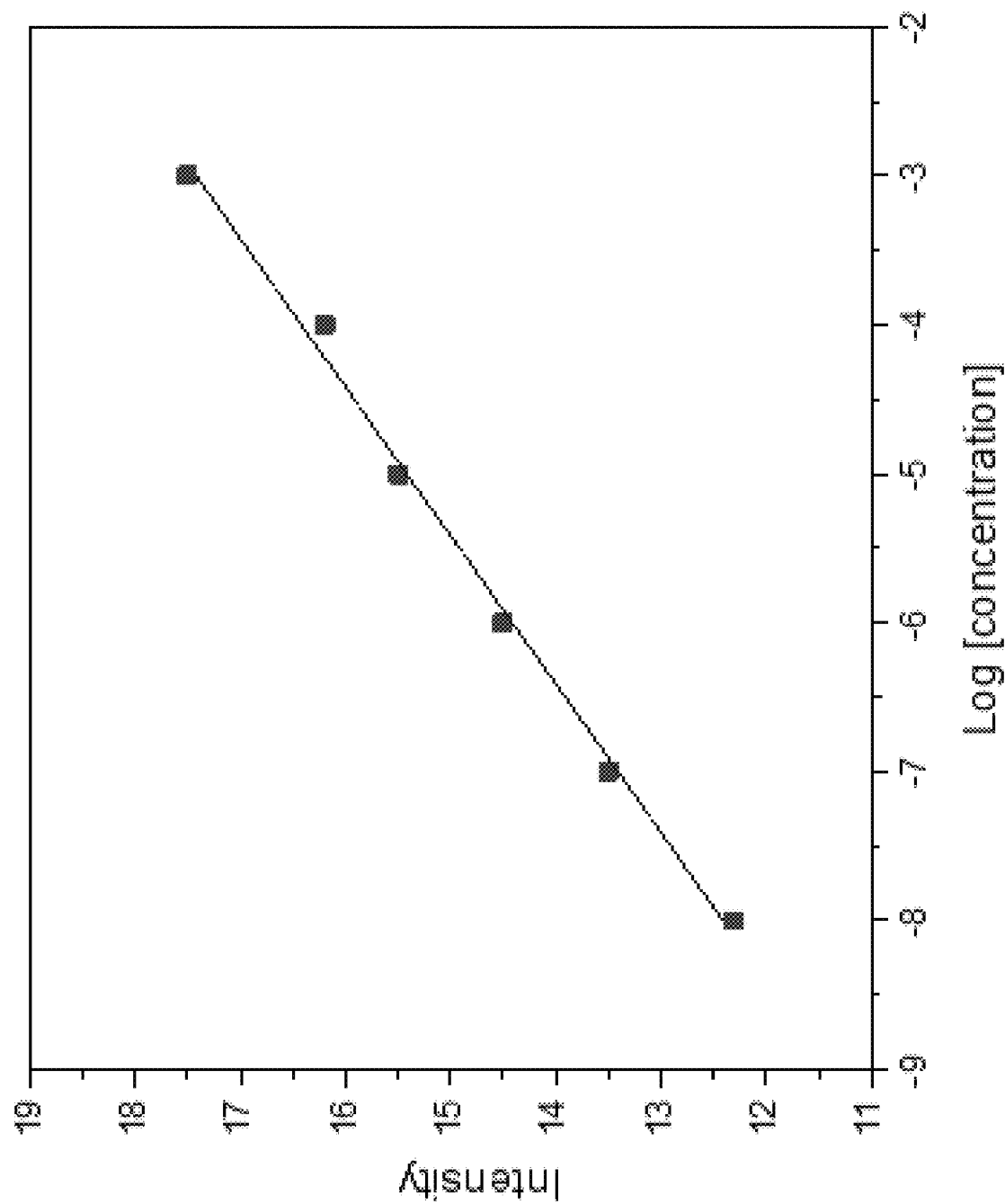
FIG. 8B is a graph illustrating the calibration curve of the band at 1608 $cm^{-1}$ of different procaine concentrations ($10^{-3}$-$10^{-8}$ M)

The SERS spectra showing the linear relationship for different molar concentrations of procaine and gold substrates is illustrated in FIG. 8B. The intensity of SERS peaks is noticed to increase linearly with the increase of the molar concentration of procaine, which shows that the intensity can be linearly associated with the concentrations of procaine solutions. All spectra were recorded in the range of 1100-1750 $cm^{-1}$. While a number of Raman peaks were noticed to moderately or significantly enhance, the most evident enhancement occurred at 1608 $cm^{-1}$ in SERS spectra has been chosen for a further quantitative determination of procaine. An intensity-concentration linear correlation in relation to that Raman peak could be observed from $10^{-3}$ to $10^{-8}$ M at laser $\lambda=633$ nm, Lase power; 50%, acquisition time of 10 s, accumulation of 100, objective; of 10× and range of spectra of 1100-1750 $cm^{-1}$. A SERS response within that concentration range yielded consistent linearity described with a coefficient ($R^2$) of 0.995. The linear relationship fitted to the data is y=1.0029X+20.432.

Table 1 lists a comparison of the linear dynamic range, coefficient, and limit of detection of several previously reported methods used for the quantitative investigation of procaine in comparison the SERS methods using the rotating disc platform of the present disclosure. It is clearly shown that the SERS-based approach developed for the trace determination of procaine possesses both a low limit of detection and a wide dynamic range.

chemical enhancement, which both are simultaneously operative. The electromagnetic mechanism is the increase in the local electric field of the absorbed molecule due to the excitation of localized surface plasmons by both the incident and scattered photons. Chemical enhancement is the increase in molecular polarizability due to the formation of a charge transfer metal and analyte molecule complex. The band is in resonance with both the incident and the scattered light.

Figure 9:
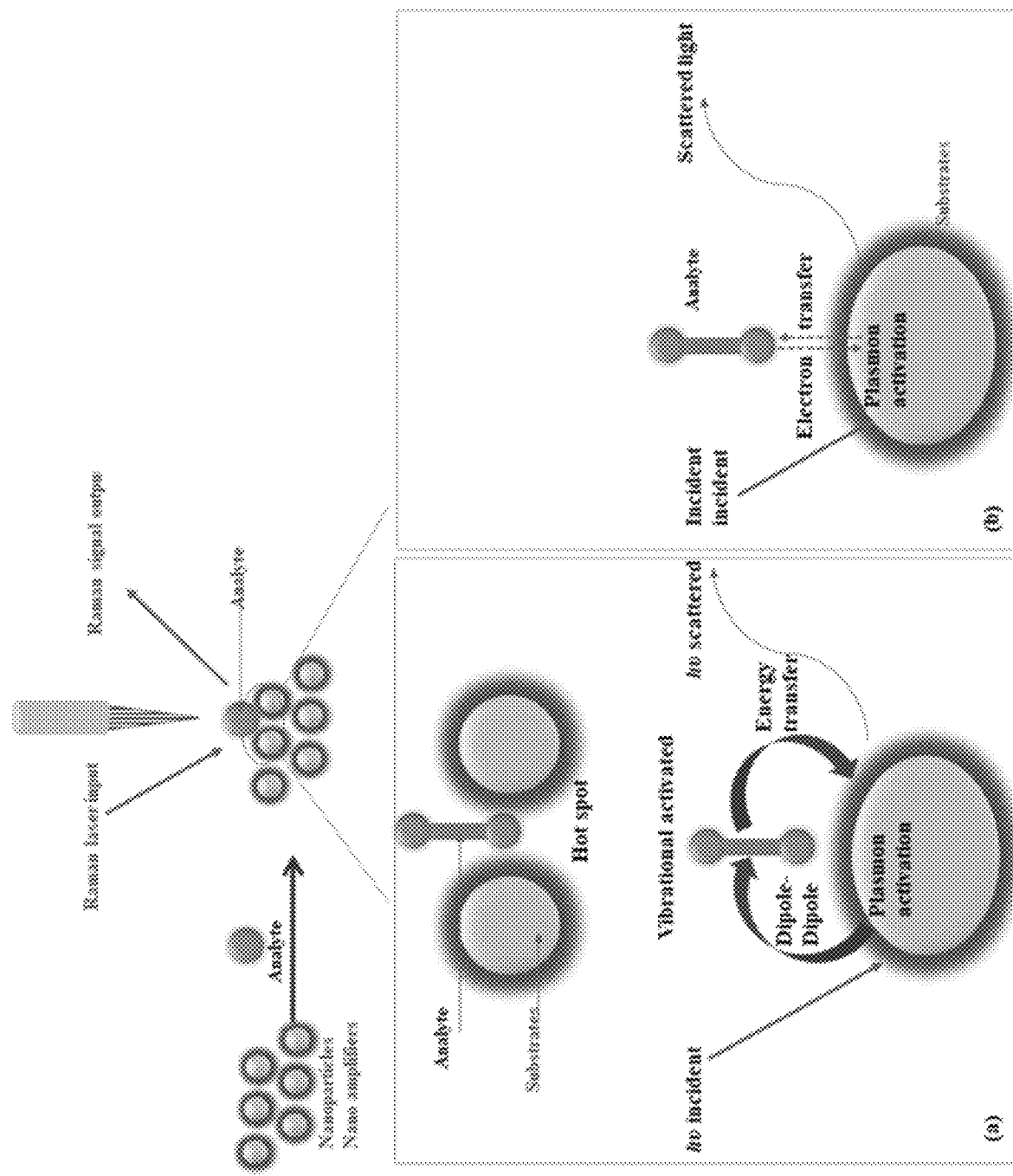
FIG. 9 illustrates activation mechanisms for the SERS enhancement for the detection of procaine.

FIG. 9 shows the interaction (a) for the electromagnetic mechanism and (b) for the chemical enhancement. Normally, the enhancement factor for the electromagnetic effect is of the order of $10^6$-$10^8$, while the enhancement factor for the chemical contribution is $10^2$ times. In chemical enhancement, molecules are mainly absorbed in certain sites of the nanoparticles surface. It is due to the electron transfer between the analyte molecules and the surfaces of the nanostructures when the energy of the incident light matches the energy of the electron transfer. The electrons of the analyte molecules interact with the electrons on the substrate nanoparticle surface, leading to an enhancement effect similar to the resonance Raman scattering. The SERS effect due to chemical enhancement differs based on substrates, adsorbed molecules, and mutual adsorption sites. Electromagnetic enhancement arises from the optical excitation of the localized surface plasmon resonances and is the dominant contributor to the SERS phenomenon. The oscillation of conduction electrons may arise in noble metal nanoparticles, sharp metal tips, and/or roughed metal nanoparticle surfaces. This leads to a redistribution of the local field and a good enhancement of the electromagnetic mechanism field at a specific position around the nanoparticles, called a hot spot, or in highly localized regions of amplified electromagnetic fields. It usually occurs in the gaps, crevices, or sharp vertices of supporting plasmonic nanomaterials.

FIG. 9 explains the possible enhancement mechanisms of SERS for the procaine molecules with gold nanoparticle substrate of the present disclosure. Enhancement takes place when the incident light excites charge transfer resonances between the gold nanoparticles (nano amplifiers) and procaine molecules. The interaction between procaine molecules and the gold substrate display a large Raman process at a cross-section of interactions compared to the Raman cross section of procaine without the nanoparticle substrate. Upon excitation of the plasmon, the electron oscillations in the nanoparticles induce a strong electromagnetic field or an evanescent wave at the surface. This field transfers energy to the procaine molecules in the form of dipole-dipole interactions. Once the energy transfer has taken place, the procaine molecule is induced to new vibrational states and

TABLE 1

Linear dynamic range (LDR) and limit of detection (LOD) of different previously reported analytical approaches compared to SERS for the trace determination of procaine.

| Method | LDR | LOD | $R^2$ |
|---|---|---|---|
| DPV | $9.0 \times 10^{-7}$ – $2.6 \times 10^{-5}$ M | $5.0 \times 10^{-8}$ M | 0.995 |
| CV | $5 \times 10^{-6}$ – $2 \times 10^{-4}$ M | $0.5 \times 10^{-6}$ M | 0.999 |
| SIA-CL | $1.8 \times 10^{-6}$ – $1.8 \times 10^{-4}$ M | $1.1 \times 10^{-6}$ M | 0.9998 |
| HPLC | 0.05 – 5.0 µg/ml | — | ≥0.998 |
| LC/MS/MS | 10.0 – 100.0 ng/ml | 0.100 ng/mL | 0.9954 |
| UV-Vis | $1.50 \times 10^{-7}$ – $4.15 \times 10^{-6}$ M | $3.80 \times 10^{-8}$ M | 0.9783 |
| SERS | $0.5 \times 10^{-3}$ – $0.5 \times 10^{-8}$ M | $0.5 \times 10^{-10}$ M | 0.995 |

Figure 10:
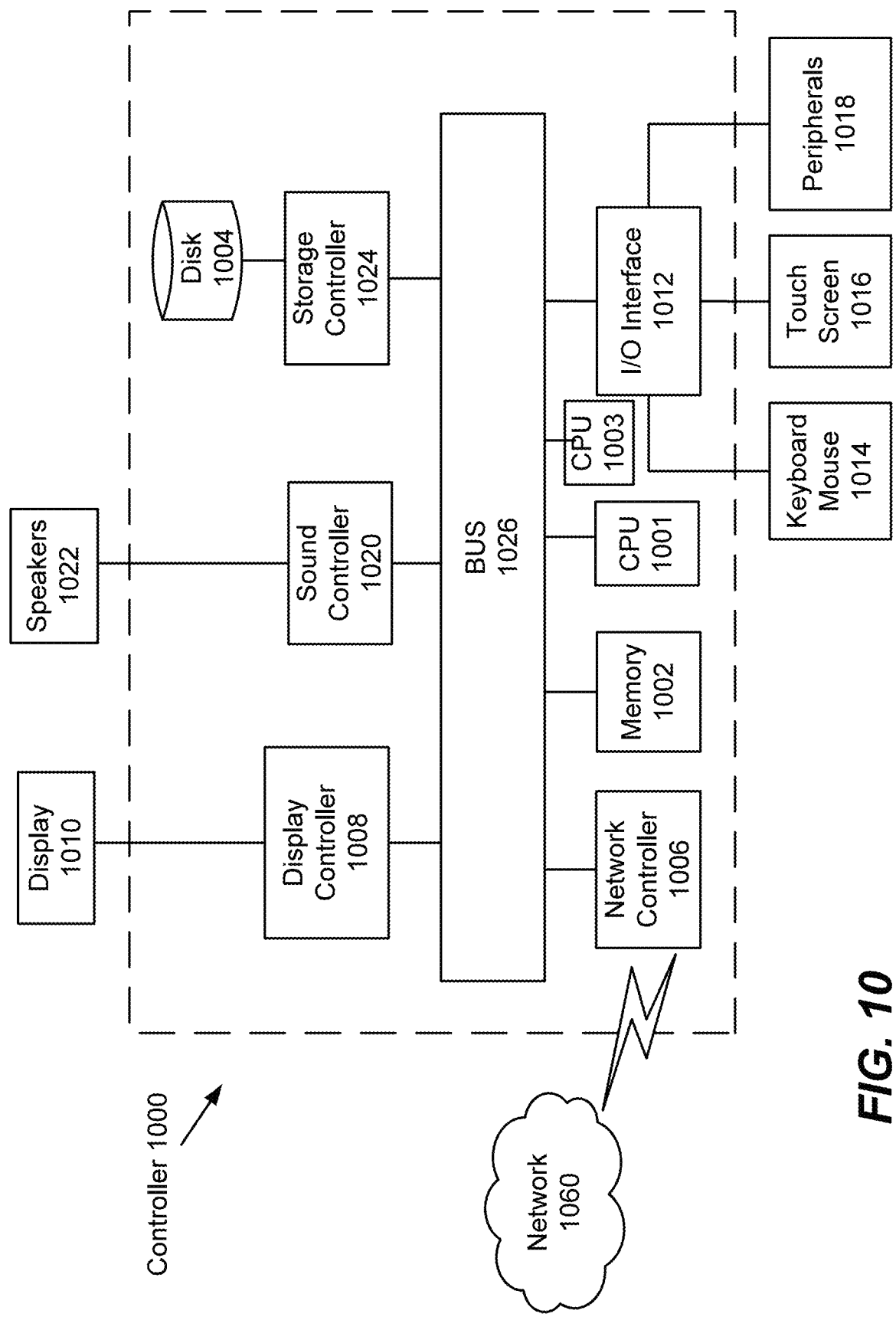
FIG. 10 is an illustration of a non-limiting example of details of computing hardware used in the computing system, according to certain embodiments.

The enhancement of the SERS effect contributes by a long-range electromagnetic mechanism and a short-range transfers its energy, slightly changed by the vibration, back into the particle and/or released directly from the procaine molecule with energy hv scattered. Next, further details of the hardware description of the computing environment of FIG. 4 according to exemplary embodiments is described with reference to FIG. 10. In FIG. 10, a controller 1000 is described is representative of the system 400 of FIG. 4 in which the controller is a computing device which includes a CPU 1001 which performs the processes described above/below. The process data and instructions may be stored in memory 1002. These processes and instructions may also be stored on a storage medium disk 1004 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 1001, 1003 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 1001 or CPU 1003 may be a Xenon or Core processor from Intel of America or an Opteron processor from AMD of America, or may be other processor types that would be recognized by one of ordinary skill in the art. Alternatively, the CPU 1001, 1003 may be implemented on an FPGA, ASIC, PLD or using discrete logic circuits, as one of ordinary skill in the art would recognize. Further, CPU 1001, 1003 may be implemented as multiple processors cooperatively working in parallel to perform the instructions of the inventive processes described above.

The computing device in FIG. 10 also includes a network controller 1006, such as an Intel Ethernet PRO network interface card from Intel Corporation of America, for interfacing with network 1060. As can be appreciated, the network 1060 can be a public network, such as the Internet, or a private network such as an LAN or WAN network, or any combination thereof and can also include PSTN or ISDN sub-networks. The network 1060 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the computing device such as Sound Blaster X-Fi Titanium from Creative, to interface with speakers/microphone 1022 thereby providing sounds and/or music.

The general purpose storage controller 1024 connects the storage medium disk 1004 with communication bus 1026, which may be an ISA, EISA, VESA, PCI, or similar, for interconnecting all of the components of the computing device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

Figure 11:
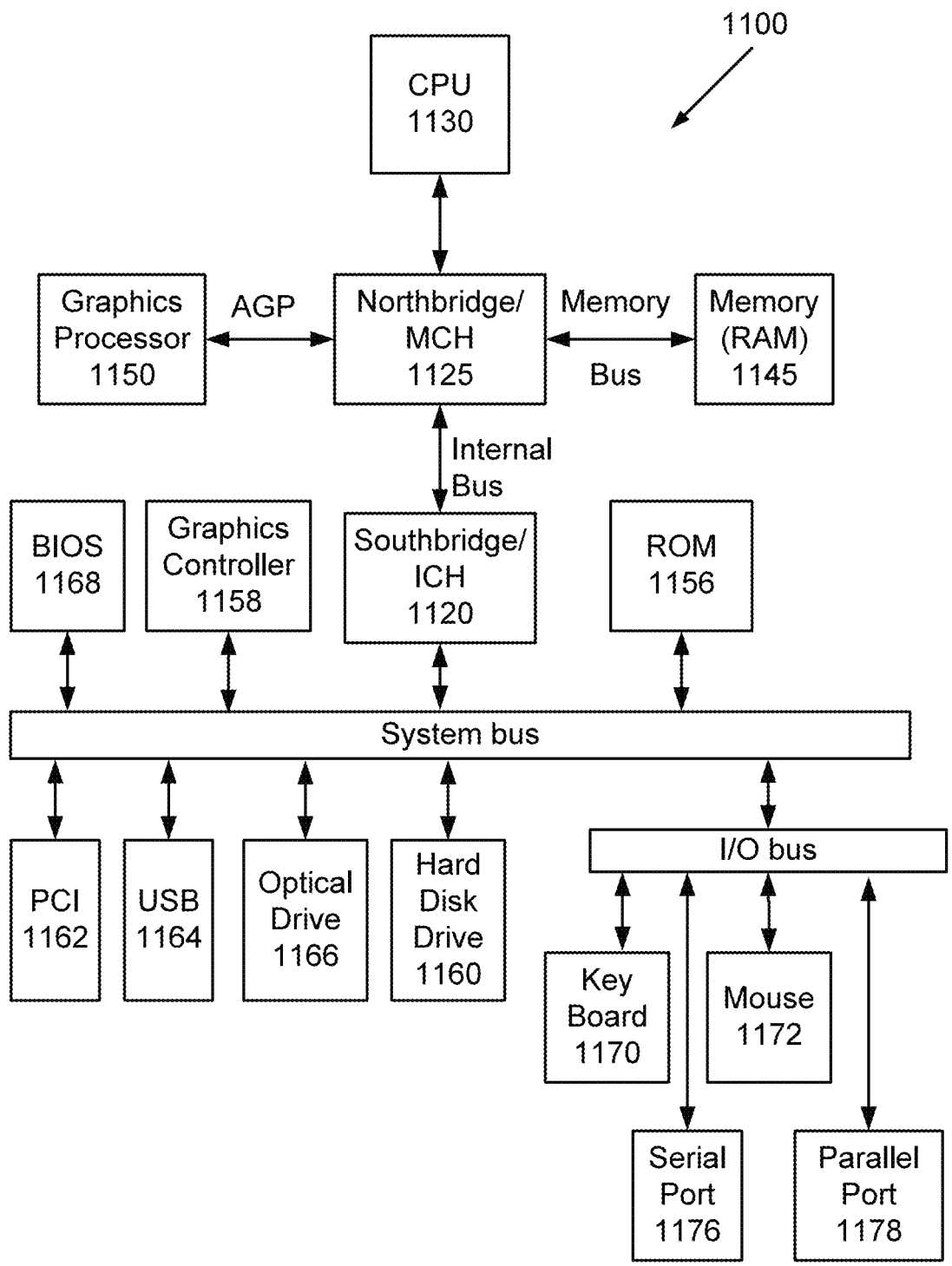
FIG. 11 is an exemplary schematic diagram of a data processing system used within the computing system, according to certain embodiments.

FIG. 11 shows a schematic diagram of a data processing system, according to certain embodiments, for performing the functions of the exemplary embodiments. The data processing system is an example of a computer in which code or instructions implementing the processes of the illustrative embodiments may be located.

In FIG. 11, data processing system 1100 employs a hub architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 1130 may contain one or more processors and even may be implemented using one or more heterogeneous processor systems.

Figure 12:
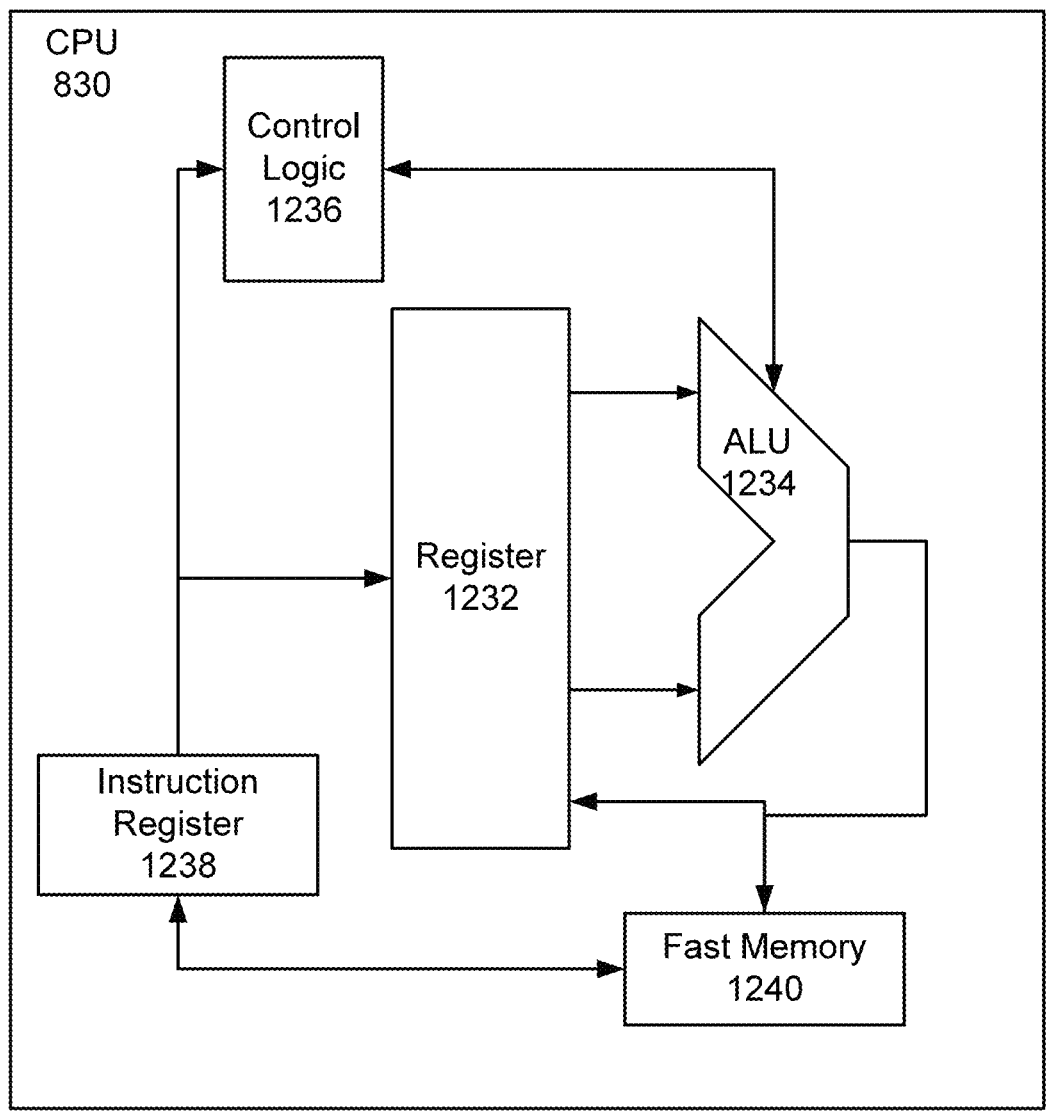
FIG. 12 is an exemplary schematic diagram of a processor used with the computing system, according to certain embodiments.

For example, FIG. 12 shows one implementation of CPU 1130. In one implementation, the instruction register 1238 retrieves instructions from the fast memory 1240. At least part of these instructions are fetched from the instruction register 1238 by the control logic 1236 and interpreted according to the instruction set architecture of the CPU 1130. Part of the instructions can also be directed to the register 1232. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1234 that loads values from the register 1232 and performs logical and mathematical operations on the loaded values according to the instructions. The results from these operations can be feedback into the register and/or stored in the fast memory 1240. According to certain implementations, the instruction set architecture of the CPU 1130 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1100 can include that the SB/ICH 1120 is coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 1188 through a PCI bus 1162.

The PCI devices may include, for example, Ethernet adapters, add-in cards, and PC cards for notebook computers. The Hard disk drive 1160 and CD-ROM 1166 can use, for example, an integrated drive electronics (IDE) or serial advanced technology attachment (SATA) interface. In one implementation the I/O bus can include a super I/O (SIO) device.

Further, the hard disk drive (HDD) 1160 and optical drive 1166 can also be coupled to the SB/ICH 1120 through a system bus. In one implementation, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 13:
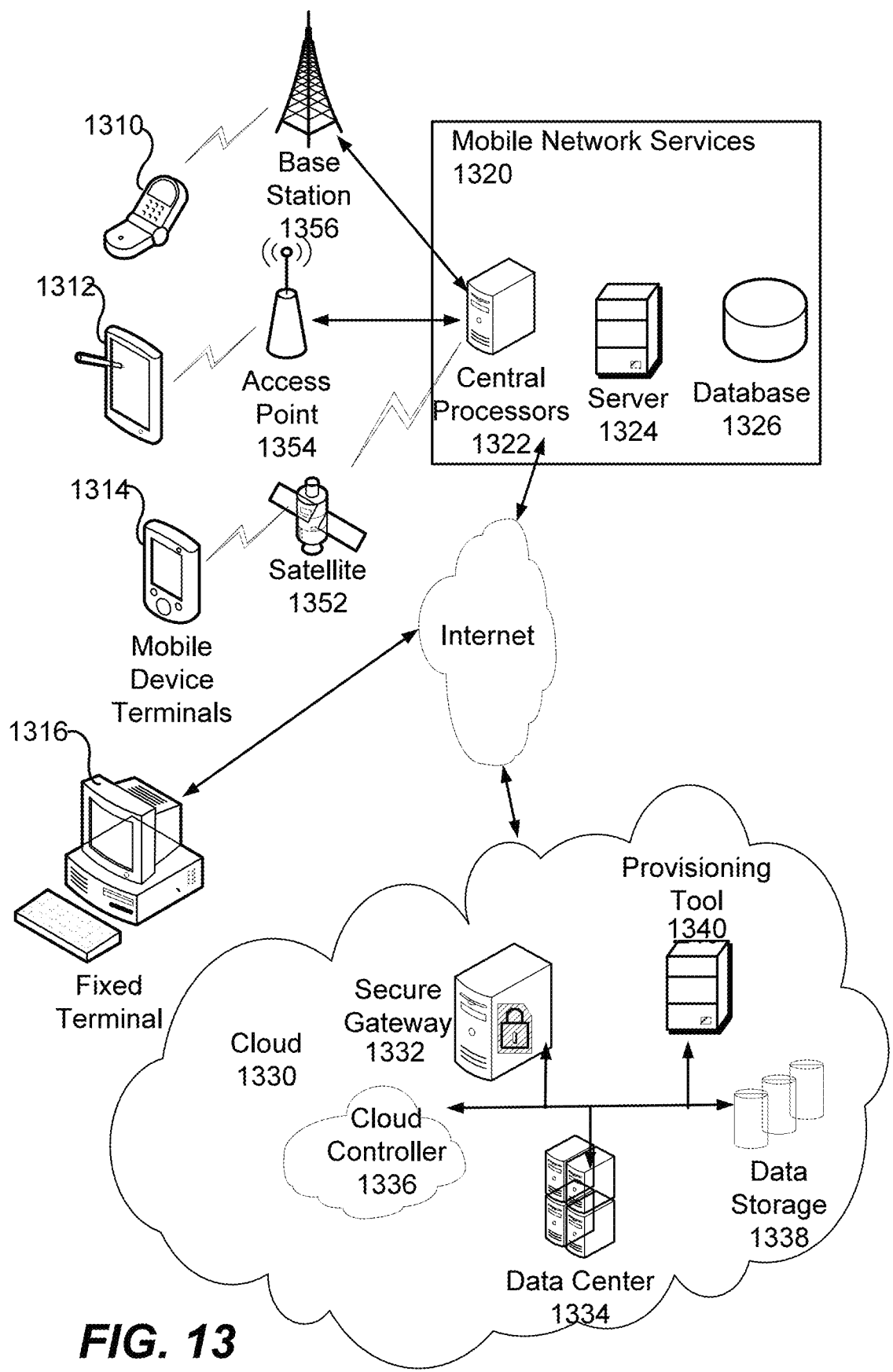
FIG. 13 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 13, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A rotating sample platform for a Surface Enhancement Raman Spectroscopy (SERS) detector, comprising:
   a rotator having an upright shaft, wherein the upright shaft is connected to the rotator and located along a vertical axis of the rotator;
   a motor having a motor shaft, wherein the motor shaft is connected to a base of the upright shaft;
   a sample platform concentrically located on the upright shaft, wherein the upright shaft is configured to protrude through the sample platform;
   a sample holder configured to hold a plurality of samples containing nanoparticles, wherein the sample holder includes a sleeve configured to fit over the upright shaft and attach to the sample platform;
   wherein the sample holder is connected to a plurality of slide supports, each slide support having an aperture configured to hold a slide, wherein each slide support is configured to tilt the slide to any one of a plurality of angles, and
   wherein each slide support comprises:
      a socket cup at a first end;
      a socket ball located within the socket cup, wherein the socket ball includes an internal magnetic strip;
      a socket ball holder configured to fit over and hold an upper portion of the socket ball;
      the socket ball holder including a read head configured to sense the magnetic strip and generate wireless signals;
      the socket ball holder further comprising a pin with a threaded end;
   a plurality of slides, wherein each slide is coated with one of a plurality of gold and a plurality of silver nanoparticles;
   a controller electrically connected to the motor, wherein the controller is configured to actuate the motor shaft to rotate the sample platform;
   a SERS detector having a laser configured to direct a light beam to each sample in the sample holder as the sample is positioned beneath the laser beam and to analyze scattered light from the sample.

2. The rotating sample platform of claim 1, further comprising
   a threaded cap;
   a plurality of pin holes in an outer radial area of the sample holder,
   wherein the threaded cap is configured to secure the threaded end of the pin when the pin is inserted into one of the pin holes.

3. The rotating sample platform of claim 2,
   wherein the controller includes circuitry and a processor having program instructions configured to receive the wireless signals from each read head and determine a tilt angle of each slide support;
   wherein the controller is further configured to display the tilt angle of each slide support.

4. The rotating sample platform of claim 1,
   wherein the controller is configured to rotate the motor shaft at a specified speed;
   wherein the controller is further configured to stop the rotation of the motor shaft for a specific dwell time when a slide is beneath the laser beam;
   wherein the controller is further configured to receive SERS spectra from the SERS detector and analyze the SERS spectra to determine corrections to the specified speed and specified dwell time.

5. The rotating sample platform of claim 1,
   wherein each aperture is further configured with a resilient padding which holds an end of a slide within the aperture.

6. The rotating sample platform of claim 1,
   wherein each slide is inserted into a slide frame;
   wherein each aperture is further configured with slots for engaging with an end of the slide frame.

7. The rotating sample platform of claim 1, wherein the sample holder is configured to hold cuvettes, wherein each cuvette contains an emulsion including one of a plurality of gold and a plurality of silver nanoparticles.

8. The rotating sample platform of claim 7, wherein the sample holder comprises circular indentations concentrically located and evenly spaced near the radial outer surface of the sample holder, wherein the each indentation is configured to hold a cuvette.

9. The rotating sample platform of claim 7,
wherein the controller is configured to rotate the motor shaft at a specified speed;
wherein the controller is further configured to stop the rotation of the motor shaft for a specific dwell time when a cuvette is beneath the laser beam;
wherein the controller is further configured to receive SERS spectra from the SERS detector and analyze the SERS spectra to determine corrections to the specified speed and specified dwell time.

10. A method for combining a rotating sample platform with Surface Enhancement Raman Spectroscopy (SERS) detection, comprising:
coating a plurality of slides with a plurality of gold or a plurality of silver nanoparticles to form a plurality of coated slides;
placing an analyte on each coated slide to form a plurality of analyte coated slides;
placing each analyte coated slide into a sample holder attached to the rotating sample platform;
rotating, with a controller, the sample platform, by actuating a motor shaft connected to the sample platform in a specified speed and dwell time pattern;
receiving, by the controller, read head signals regarding a tilt angle of each analyte coated slide;
displaying the tilt angle of each analyte coated slide;
consecutively radiating a laser beam, with a SERS detector, onto each analyte coated slide;
detecting, with the SERS detector, Raman spectra of each analyte coated slide;
receiving, by the controller, the Raman spectra of the analyte on each analyte coated slide;
analyzing, by processing circuitry of the controller, the Raman spectra and tilt angle of each analyte coated slide to determine corrections to the specified speed and dwell time pattern;
actuating, with the controller, the motor in a corrected speed and dwell time pattern; and
generating, with the controller including processing circuitry configured for analyzing the Raman spectra, a calibration curve for each analyte coated slide.

11. The method of claim 10, wherein the plurality of nanoparticles are gold nanoparticles and the analyte is procaine.

12. The method of claim 10,
wherein the plurality of nanoparticles are silver nanoparticles;
wherein the silver nanoparticles are hydroxylamine-reduced silver colloid; and
wherein the analyte is one of phenanthrene, naphthalene and valeric acid.

13. The method of claim 10, wherein the silver nanoparticles are silver loaded graphene and the analyte is thiouracil.

14. The method of claim 10, further comprising:
placing each analyte coated slide within a slide receiving aperture of a slide support;
tilting each analyte coated slide support by a different number of degrees with respect to a direction of the laser beam;
rotating, by the motor, the slide holder beneath the laser beam for a specified dwell time;
detecting, with the SERS detector, the amplitudes of the Raman spectra of each analyte coated slide;
determining, by the processing circuitry of the controller, the tilt angle which generates the greatest amplitude of the Raman spectra.

\* \* \* \* \*